United States Patent
Aukes et al.

(10) Patent No.: US 12,240,283 B2
(45) Date of Patent: Mar. 4, 2025

(54) BUCKLING BEAMS FOR UNDERWATER AND TERRESTRIAL AUTONOMOUS VEHICLES

(71) Applicants: Daniel Aukes, Gilbert, AZ (US); Mohammad Sharifzadeh, Phoenix, AZ (US); Yuhao Jiang, Tempe, AZ (US)

(72) Inventors: Daniel Aukes, Gilbert, AZ (US); Mohammad Sharifzadeh, Phoenix, AZ (US); Yuhao Jiang, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 60 days.

(21) Appl. No.: 17/966,550

(22) Filed: Oct. 14, 2022

(65) Prior Publication Data
US 2023/0121727 A1 Apr. 20, 2023

Related U.S. Application Data

(60) Provisional application No. 63/255,929, filed on Oct. 14, 2021.

(51) Int. Cl.
*B60F 5/02* (2006.01)
*B60F 3/00* (2006.01)
*B62D 57/02* (2006.01)
*B63H 1/32* (2006.01)
*B64C 33/02* (2006.01)

(52) U.S. Cl.
CPC ............... *B60F 5/02* (2013.01); *B62D 57/02* (2013.01); *B63H 1/32* (2013.01); *B64C 33/02* (2013.01); *B60F 3/003* (2013.01)

(58) Field of Classification Search
CPC ....... B64C 33/02; B64C 33/025; B64U 10/40; A63H 27/008
See application file for complete search history.

(56) References Cited

U.S. PATENT DOCUMENTS

| | | | |
|---|---|---|---|
| 8,700,233 B1* | 4/2014 | Doman | B64C 33/02 701/4 |
| 2007/0138339 A1* | 6/2007 | Sinclair | A63H 27/008 244/72 |
| 2021/0291977 A1* | 9/2021 | Yang | B64C 39/028 |

(Continued)

FOREIGN PATENT DOCUMENTS

CN 107972754 11/2020

OTHER PUBLICATIONS

Baek et al., "Curved compliant facet origami based self-deployable gliding wing module for jump-gliding," in Proc. ASME Int. Des. Eng. Tech. Conf. Comput. Inf. Eng., 2016, Paper DETC2016-60543, 8 pages.

(Continued)

*Primary Examiner* — Joshua J Michener
*Assistant Examiner* — Arfan Y. Sinaki
(74) *Attorney, Agent, or Firm* — Fish & Richardson P.C.

(57) ABSTRACT

A mechanical system includes a curved beam and a motor coupled to the curved beam. The curved beam is configured to buckle at two different locations along the positive and negative portions of its load/displacement curve, corresponding to opposite and equal sense bending directions. The motor is configured to impart a flapping motion to the curved beam.

22 Claims, 10 Drawing Sheets

(56) References Cited

U.S. PATENT DOCUMENTS

2021/0354800 A1* 11/2021 Yu .................... B64U 10/70
2022/0274698 A1* 9/2022 Deng .................. H02K 7/003

OTHER PUBLICATIONS

Baek et al., "Ladybird beetle-inspired compliant origami," Sci. Robot., vol. S, No. 41, 2020, pp. 11 pages.
Becker et al., "On self-propulsion of micro-machines at low Reynolds number: Purcell's three-link swimmer," J. Fluid Mechanics, vol. 490, pp. 15-35, 2003.
Behbahani et al., "A dynamic model for robotic fish with flexible pectoral fins," in Proc. IEEE/ASME Int. Conf. Adv. Intell. Mechatronics, 2013, pp. 1552-1557.
Behbahani et al., "Design and modeling of flexible passive rowing joint for robotic fish pectoral fins," IEEE Trans. Robot., vol. 32, No. 5, pp. 1119-1132, Oct. 2016.
Combes et al., "Flexural stiffness in insect wings II. Spatial distribution and dynamic wing bending," J. Exp. Biol., vol. 206, No. 17, pp. 2989-2997, 2003.
Di Santo et al., "Batoid locomotion: Effects of speed on pectoral fin deformation in the little skate, leucoraja erinacea," J. Exp. Biol., vol. 220, No. 4, pp. 705-712, 2017.
Doncieux et al., "Evolutionary robotics: What, why, and where to," Front. Robot. AI, vol. 2, No. 4, pp. 1-18, 2015.
Drotman et al., "Application driven design of soft, 3-D printed, pneumatic actuators with bellows," IEEE/ASME Trans. Mechatronics, vol. 24, No. 1, pp. 78-87, Feb. 2019.
Essenberg, "The habits and natural history of the backswimmers notonectidae." J. Animal Behav., vol. 5, No. 5, pp. 381-390, 1915.
Fanta, "Anatomy of the nauplii of oithona ovalis herbst (copepoda, cyclopoida)," Boletim de Zoologia , Univ. S. Paulo, vol. 1, pp. 205-238, 1976.
Flammang et al., "Caudal fin shape modulation and control during acceleration, braking and backing maneuvers in bluegill sunfish, *Lepomis macrochirus*," J. Exp. Biol., vol. 212, No. 2, pp. 277-286, 2009.
Ghatak et al., "Hysteresis of soft joints embedded with fluid-filled microchannels," J. Roy. Soc. Interface, vol. 6, No. 31, pp. 203-208, 2008.
Gravish et al., "Anomalous yaw torque generation from passively pitching wings," in Proc. IEEE Int. Conf. Robot. Autom., 2016, pp. 3282-3287.
Hansen, "The CMA evolution strategy: A comparing review," Towards a new evolutionary computation: Advances in the estimation of distribution algorithms, 2006, pp. 75-102.
Hatton et al., "Geometric visualization of self-propulsion in a complex medium," Phys. Rev. Lett., Feb. 2013, vol. 110, No. 078101, 5 pages.
Hodick et al., "On the mechanism of trap closure of venus flytrap (*Dionaea muscipula ellis*)," Planta, vol. 179, No. 1, pp. 32-42, 1989.
Hoffait et al., "Dynamic analysis of the self-locking phenomenon in tape-spring hinges," Acta Astronautica, vol. 66, No. 7-8, pp. 1125-1132, 2010.
Jiang et al., "Tunable Dynamic Walking via Soft Twisted Beam Vibration," submitted Nov. 1, 2022, arXiv:2211.00715, 8 pages.
Jiang et al., "Knuckles that buckle: Compliant underactuated limbs with joint hysteresis enable minimalist terrestrial robots," in Proc. IEEE/RSJ Int. Conf. Intell. Robots Syst., Las Vegas, NV, USA, 2020, pp. 3732-3738.
Jiang et al., "Reconfigurable soft flexure hinges via pinched tubes," in Proc. IEEE/RSJ Int.Conf. Intell. Robots Syst., 2020, pp. 8843-8850.
Jiang et al., "Shape Change Propagation Through Soft Curved Materials for Dynamically-Tuned Paddling Robots," 2021 IEEE 4th International Conference on Soft Robotics (RoboSoft), Apr. 12-16, 2021, Yale University, USA, 8 pages.
Jung et al., "Underactuated adaptive gripper using flexural buckling," IEEE Trans. Robot., vol. 29, No. 6, pp. 1396-1407, Dec. 2013.
Kato et al., "Development of biology inspired autonomous underwater vehicle 'Bass III' with high maneuverability," in Proc. Int. Symp. Underwater Technol. (Cat. No. 00EX418)., 2000, pp. 84-89.
Kato et al., "Elastic pectoral fin actuators for biomimetic underwater vehicles," in Proc. Bio-Mechanisms Swimming Flying, 2008, pp. 271-282.
Kebadze et al., "Bistable prestressed shell structures," Int. J. Solids Struct., vol. 41, No. 11-12, pp. 2801-2820, 2004.
Kim et al., "Flytrap inspired robot using structurally integrated actuation based on bistability and a developable surface," Bioinspiration Biomimetics, vol. 9, No. 3, 2014, Art. No. 036004, 15 pages.
Koh et al., "A modular folded laminate robot capable of multi modal locomotion," in Proc. Int. Symp. Exp. Robot., 2017, pp. 59-70.
Kwak et al., "Comprehensive analysis of efficient swimming using articulated legs fringed with flexible appendages inspired by a water beetle," Bioinspiration Biomimetics, vol. 14, No. 6, 2019, Art. No. 066003, 18 pages.
Lauder et al., "Fish locomotion: Kinematics and hydrodynamics of flexible foil-like fins," Experiments Fluids, vol. 43, No. 5, pp. 641-653, 2007.
Lauder et al., "Pectoral fin locomotion in fishes: Testing drag-based models using three-dimensional kinematics," Amer. Zoologist, vol. 36, No. 6, pp. 567-581, 1996.
Markin et al., "Active movements in plants: Mechanism of trap closure by dionaea muscipula ellis," Plant Signaling Behav., vol. 3, No. 10, pp. 778-783, 2008.
Mazaheri et al., "Experimental investigation of the effect of chordwise flexibility on the aerodynamics of flapping wings in hovering flight," J. Fluids Struct., vol. 26, No. 4, pp. 544-558, 2010.
Mintchev et al., "Bioinspired dual-stiffness origami," Sci. Robot., vol. 3, No. 20, 2018, Art No. eaau0275, 8 pages.
Naser et al., "Design, modeling, and experimental validation of a concave-shape pectoral fin of labriform-mode swimming robot," Eng. Rep., vol. 1, No. 5, 2019, Art No. e12082, 17 pages.
Nguyen et al., "Curvature-induced stiffening of a fish fin," J. Roy. Soc. Interface, vol. 14, No. 130, 2017, Art. No. 20170247, 11 pages.
Omidvar et al., "A comparative study of CMA-ES on large scale global optimisation," in Proc. Australas. Joint Conf. Artif. Intell. Berlin, Germany: Springer, 2010, pp. 303-312.
Palmisano et al., "Design of a biomimetic controlled-curvature robotic pectoral fin," in Proc. IEEE Int. Conf. Robot. Autom., 2007, pp. 966-973.
Pandey et al., "Dynamics of snapping beams and jumping poppers," Europhys. Lett., vol. 105, No. 2, 2014, Art. No. 24001, 7 pages.
Pham et al., "Dynamic analysis of a robotic fish propelled by flexible folding pectoral fins," Robotica, vol. 38, No. 4, pp. 699-718, 2020.
Purcell, "Life at low Reynolds number," Amer. J. Phys., vol. 45, No. 1, pp. 3-11, 1977.
Roberts et al., "On the controllability of fixed wing perching," in Proc. IEEE Amer. Control Conf., 2009, pp. 2018-2023.
Saito et al., "Investigation of hindwing folding in ladybird beetles by artificial elytron transplantation and microcomputed tomography," Proc. Nat. Acad. Sci., vol. 114, No. 22, pp. 5624-5628, 2017.
Seffen, "Mechanical memory metal: A novel material for developing morphing engineering structures," Scripta Materialia, vol. 55, No. 4, pp. 411-414, 2006.
Seffen, "On the behavior of folded tape-springs," J. Appl. Mech., vol. 68, No. 3, pp. 369-375, 2001.
Sharifzadeh et al., (2021). Curvature-Induced Buckling for Flapping-Wing Vehicles. IEEE/ASME Transactions on Mechatronics, 26(1), 503-514.
Sharifzadeh et al., (2021). Reconfigurable Curved Beams for Selectable Swimming Gaits in an Underwater Robot. IEEE Robotics and Automation Letters, 6(2), 3437-3444.
Shin et al., "Development of hybrid vibration isolator by inertial type actuator and wire mesh mount," IEEE/ASME Trans. Mechatronics, vol. 24, No. 3, pp. 1356-1367, Jun. 2019.
Simha et al., "A flapped paddle-fin for improving underwater propulsive efficiency of oscillatory actuation," IEEE Robot. Automat. Lett., vol. 5, No. 2, pp. 3176-3181, Apr. 2020.

(56) References Cited

OTHER PUBLICATIONS

Sitorus et al., "Design and implementation of paired pectoral fins locomotion of labriform fish applied to a fish robot," J. Bionic Eng., vol. 6, No. 1, pp. 37-45, 2009.

Soykasap, "Analysis of tape spring hinges," Int. J. Mech. Sci., vol. 49, No. 7, pp. 853-860, 2007.

Sudo et al., "On the motility and locomotive organs of beach flea," J. Aero Aqua Bio-Mechanisms, vol. 4, No. 1, pp. 37-43, 2015.

Veenstra et al., "Evolution of fin undulation on a physical knifefish-inspired soft robot," in Proc. Genet. Evol. Comput. Conf., 2018, pp. 157-164.

Vogel et al., "Motor-driven bacterial flagella and buckling instabilities," Eur. Phys. J. E, vol. 35, No. 2, 2012, Art. No. 15, 15 pages.

Volkov et al., "Kinetics and mechanism of dionaea muscipula trap closing," Plant Physiol., vol. 146, No. 2, pp. 694-702, 2008.

Walker et al., "Deformable wing kinematics in the desert locust: How and why do camber, twist and topography vary through the stroke?" J. Roy. Soc. Interface, vol. 6, No. 38, pp. 735-747, 2008.

Walker et al., "Experimental investigation of tape springs folded in three dimensions," AIAA J., vol. 44, No. 1, pp. 151-159, 2006.

Walker et al., "Kinematics, dynamics, and energetics of rowing and flapping propulsion in fishes," Integrative Comp. Biol., vol. 42, No. 5, pp. 1032-1043, 2002.

Walker, "Functional morphology and virtual models: Physical constraints on the design of oscillating wings, fins, legs, and feet at intermediate Reynolds numbers," Integrative Comp. Biol., vol. 42, No. 2, pp. 232-242, 2002.

Wang et al., "Design and evaluation of a soft robotic smart shoe for haptic terrain rendering," IEEE/ASME Trans. Mechatronics, vol. 23, No. 6, pp. 2974-2979, 2018.

Whitney et al., "Aeromechanics of passive rotation in flapping flight," J. Fluid Mech. (2010), vol. 660, pp. 197-220.

Whitney, "Design and performance of insect-scale flapping-wing vehicles," Ph.D. dissertation, Dept. School Eng. Appl. Sci., Harvard Univ., Cambridge, MA, USA, 2012, 116 pages.

Wootton, "Geometry and mechanics of insect hindwing fans: A modelling approach," Proc. Roy. Soc. London. Ser. B, Biol. Sci., vol. 262, No. 1364, pp. 181-187, 1995.

Young et al., "Details of insect wing design and deformation enhance aerodynamic function and flight efficiency," Science, vol. 325, No. 5947, pp. 1549-1552, 2009.

\* cited by examiner

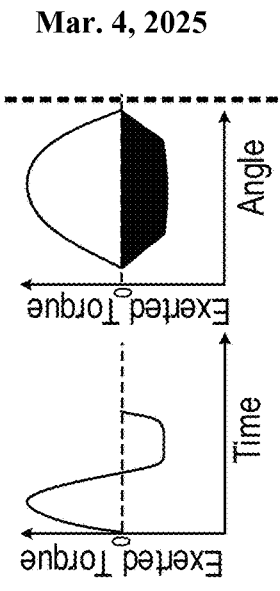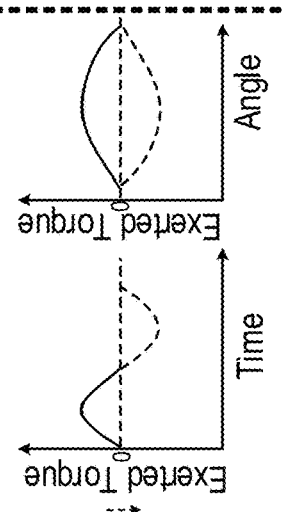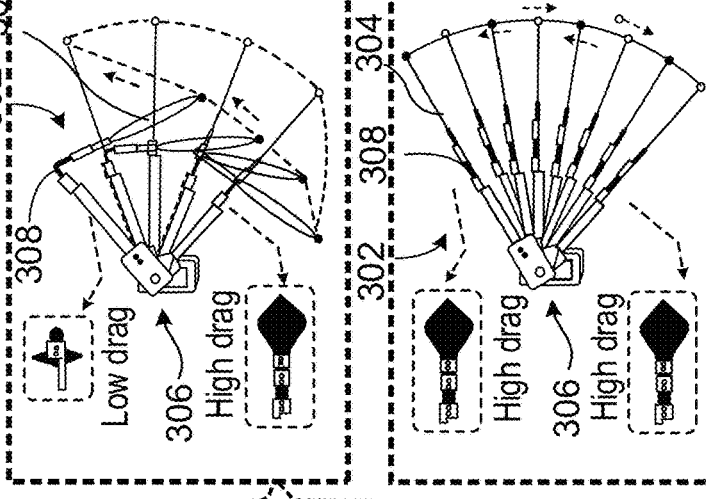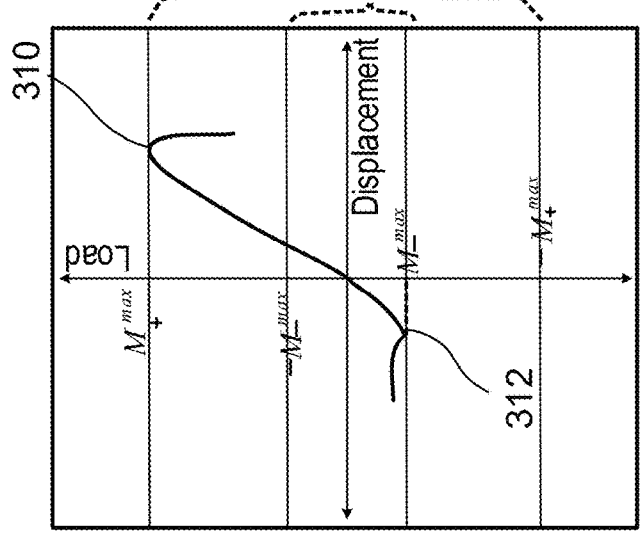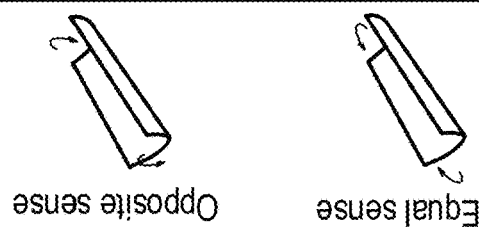

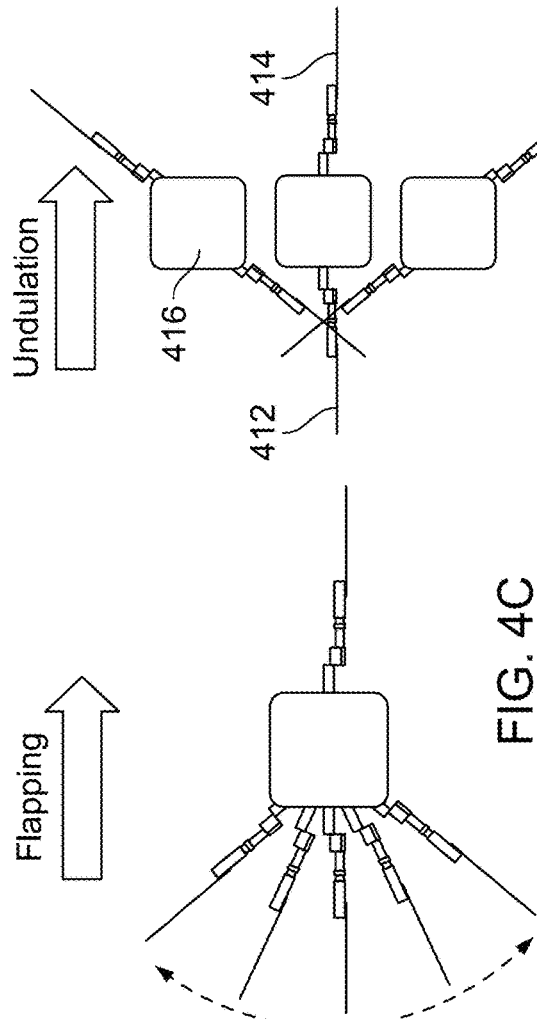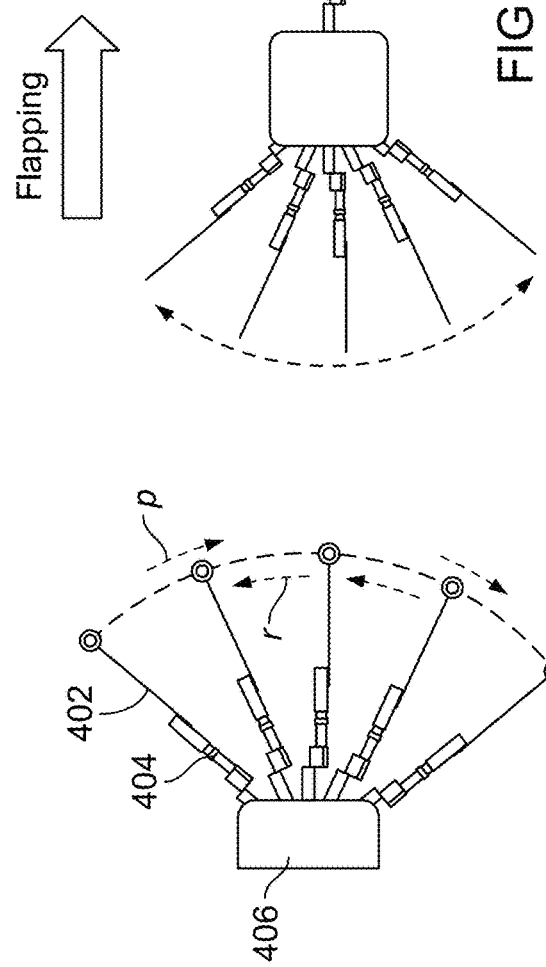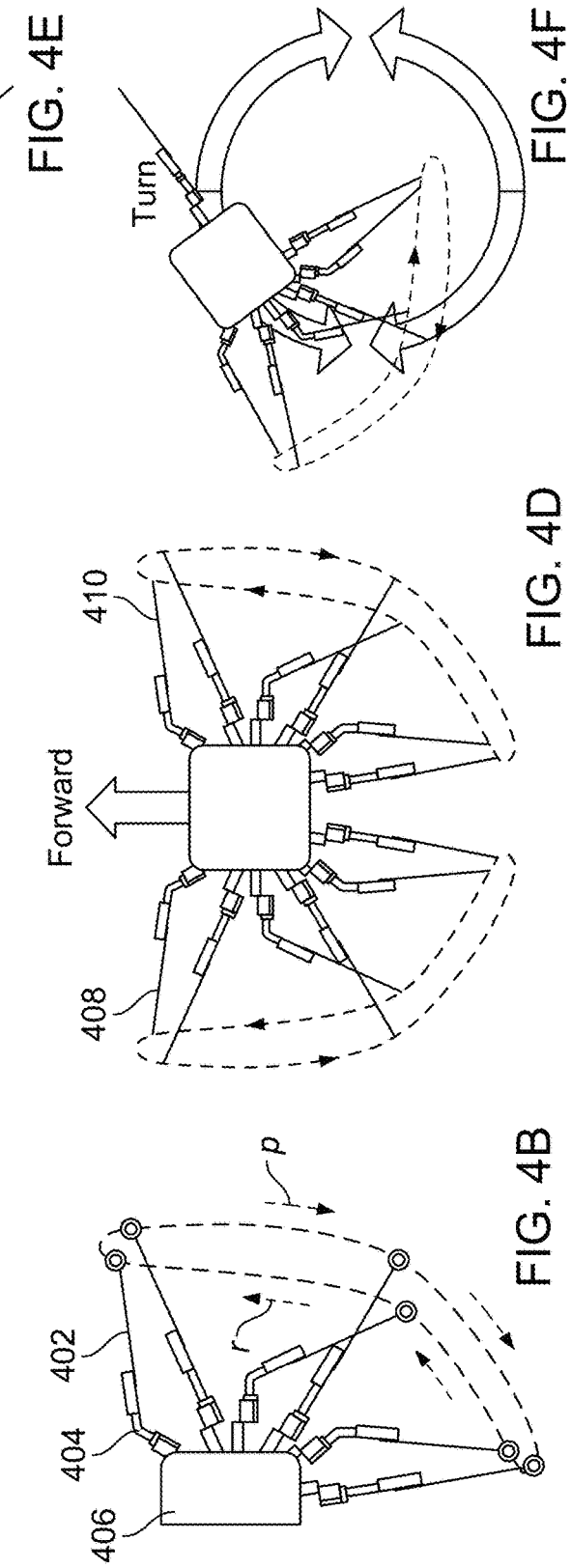

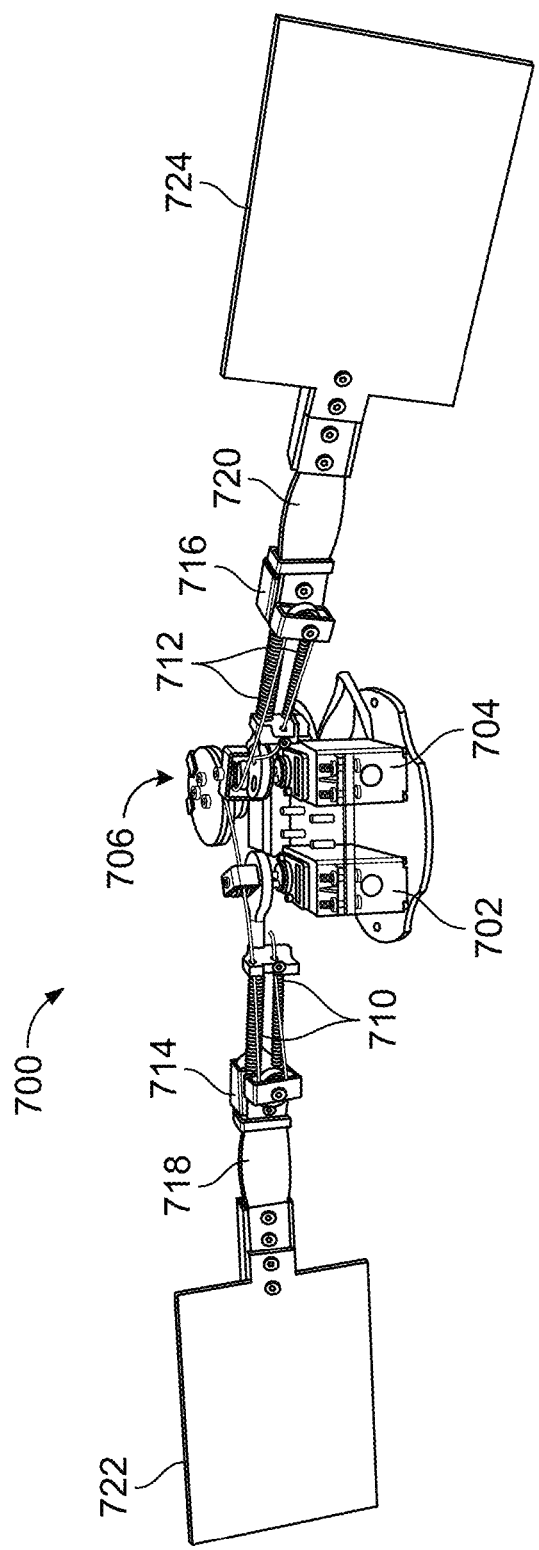
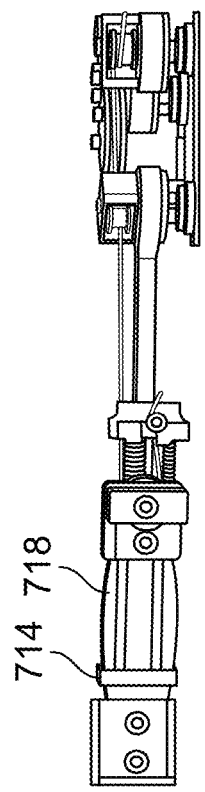
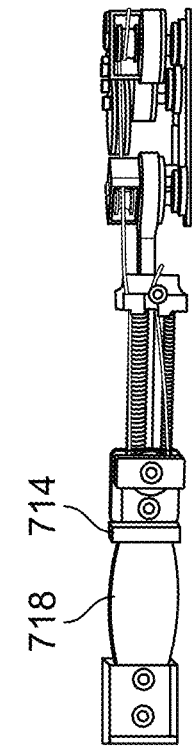
FIG. 7A
FIG. 7B
FIG. 7C

BUCKLING BEAMS FOR UNDERWATER AND TERRESTRIAL AUTONOMOUS VEHICLES

CROSS-REFERENCE TO RELATED APPLICATION

This application claims the benefit of U.S. Patent Application 63/255,929 filed on Oct. 14, 2021, which is incorporated herein by reference in its entirety.

STATEMENT OF GOVERNMENT SUPPORT

This invention was made with government support under 1935324 awarded by the National Science Foundation. The government has certain rights in the invention.

TECHNICAL FIELD

This invention relates to asymmetric buckling of thin curved beams to achieve locomotion by robots or autonomous vehicles in a fluid or on land.

BACKGROUND

Uses of mobile robots and autonomous vehicles include accessing areas inaccessible or dangerous to humans, transporting payloads, performing complex maintenance and repair tasks, monitoring and exploring hostile environments, and performing search and rescue functions. Means of locomotion for robots and autonomous vehicles in fluids include swimming gaits such as rowing, paddling, and flapping, commonly seen in biological systems such as frogs, insects, and humans. On land, forward motion can be created by a simple walking gait.

Buckling is a condition in which small geometric perturbations lead to drastic reductions in load-carrying capacity in structural systems. In general, buckling occurs when a material exhibits a nonlinear and often rapid drop-off in force due to small changes in shape. Once a buckling condition is met, the material deforms quickly, resulting in a new load/displacement curve with a much smaller stiffness coefficient.

SUMMARY

This disclosure generally relates to the use of curved surfaces for producing preferential buckling that can be used to create forward thrust in mobile robots and autonomous vehicles. A dynamic model has been developed to model the swimming behavior of a robot using buckling joints. Design optimization using the Covariance Matrix Adaption Evolution Strategy (CMA-ES) facilitates the selection of design and gait parameters that maximize the robot's forward swimming speed. Favorable gait patterns across a number of swimming strategies such as rowing, flapping, and undulation can be identified. By actively altering the curved beam's buckling limits, an untethered robot can be configured to maneuver in water across each of these swimming strategies.

In a first general aspect, a mechanical system includes a curved beam and a motor coupled to the curve beam. The curved beam is configured to buckle at two different locations along the positive and negative portions of its load/displacement curve, corresponding to opposite and equal sense bending directions. The motor is configured to impart a flapping motion to the curved beam.

Implementations of the first general aspect can include one or more of the following features.

The curved beam can be bistable. Some implementations further include a servomechanism coupled the curved beam and the motor. In some cases the motor is configured to activate the servomechanism, and the servomechanism is configured to impart the flapping motion to the curved beam. The flapping motion can be maintained below a buckling limit of the curved beam in the positive and negative portions of the load/displacement curve. In some implementations, the flapping motion includes buckling the curved beam only in the equal sense bending direction. A larger surface of the curved beam can be configured to travel substantially parallel with a direction of motion of the mechanical system. In some cases, a motion of the curved beam includes a power phase and a recovery phase.

Drag forces on the curved beam in the power phase can exceed drag forces on the curved beam during the recovery phase. In some implementations, the difference in drag forces generates nonzero average work over a flapping cycle. An input from a motor can be symmetric. In some cases, the flapping motion exceeds the buckling limit of the curved beam in the positive and negative portions of the load/displacement curve. The curved beam can include one or more fins. In some implementations, the mechanical system is a robot. A robot can include the mechanical system of the first general aspect. In some implementations, the curved beam includes one or more wings, one or more fins, or both. A method of inducing locomotion can include activating the mechanical system of the first general aspect. In some cases, the mechanical system is a robot. Inducing the locomotion can occur in a fluid. The fluid can include a gas or a liquid. In some cases, the fluid includes air. In some implementations, the fluid includes water.

Inventive aspects of this disclosure include the use of preferential buckling or bistable elements in cyclic, flapping systems to generate asymmetric work loops that can produce positive average thrust or locomotion. The control of curvature, speed, or other design parameters to tune the buckling effect, both during the design process, as well as in use, is also inventive.

Nonlinear stiffness and asymmetric buckling behavior of curved surfaces to achieve locomotion in robotic systems provide several advantages. This behavior can be utilized, tuned, and actively reconfigured to achieve locomotion on land and in fluids, even in the presence of symmetric flapping, to produce a "breaststroke"-like swimming gait, or, if stiffened, to flap like the tail fin of a fish. Tunability can be achieved through control of length, curvature, material properties, or other geometric parameters. The use of nonlinear buckling allows the rational design of locomotive systems that use fewer moving parts to achieve high-degree-of-freedom motion on land and in water and allows tunability and reconfigurability. The buckling system allows for simple mechanical implementation, reduces the number of high-power motors, and changes the behavior of the device on demand.

The details of one or more embodiments of the subject matter of this disclosure are set forth in the accompanying drawings and the description. Other features, aspects, and advantages of the subject matter will become apparent from the description, the drawings, and the claims.

BRIEF DESCRIPTION OF DRAWINGS

FIG. 3A is a load/displacement curve showing points of buckling in a positive and negative direction. FIG. 3B shows motion of a wing in a one-sided buckling regime. FIG. 3C depicts the torque exerted by a wing on a fixed frame with respect to time and joint angle for a one-side buckling regime. FIG. 3D depicts motion of a wing in a no-buckling regime. FIG. 3E depicts the torque exerted by a wing on a fixed frame with respect to time and joint angle for a no-buckling regime.

FIG. 4A depicts a flapping gait. FIG. 4B depicts a rowing gait. FIG. 4C depicts lateral swimming using one fin flapping. FIG. 4D depicts forward swimming using two fins rowing. FIG. 4E shows forward swimming using two fins undulating. FIG. 4F shows turning using two fins rowing at different speeds.

FIG. 7A shows an embodiment of a swimming robot using two curved buckling beam fins. FIGS. 7B and 7C show a slider positioned to produce a long and effective beam length, respectively.

DETAILED DESCRIPTION

This disclosure describes devices that use the preferential buckling of curved beams which, by a passive reduction of effective area in recovery stroke, generates positive net thrust and moment. The devices utilize a design concept featuring an under-actuated compliant fin system that uses slender curved beams and their ability to buckle preferentially in one direction under symmetric motor inputs to produce net thrust and moments. The locomotion system is assessed using dynamic modeling and simulation, as well as experimental evaluation of a swimming robot that utilizes the proposed fin design to enhance maneuverability by switching between rowing and flapping gaits across different swimming scenarios. The air drag exerted on a wing utilizing curved beam buckling was also analyzed.

Figure 1B:
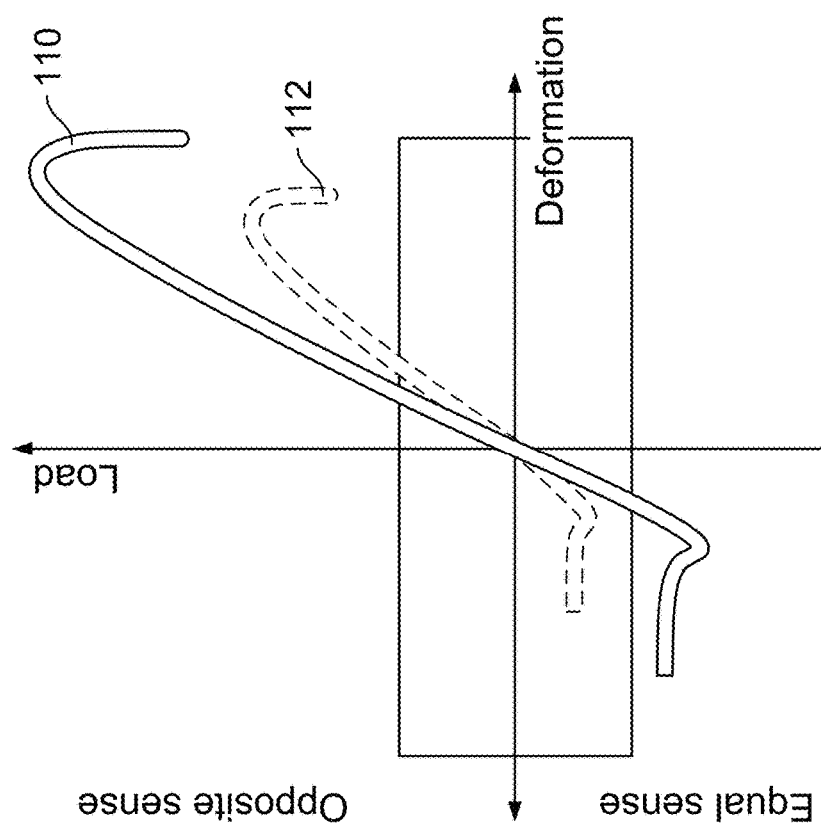
FIG. 1B depicts the nonlinear behavior of curved beams subjected to a load.
Figure 1A:
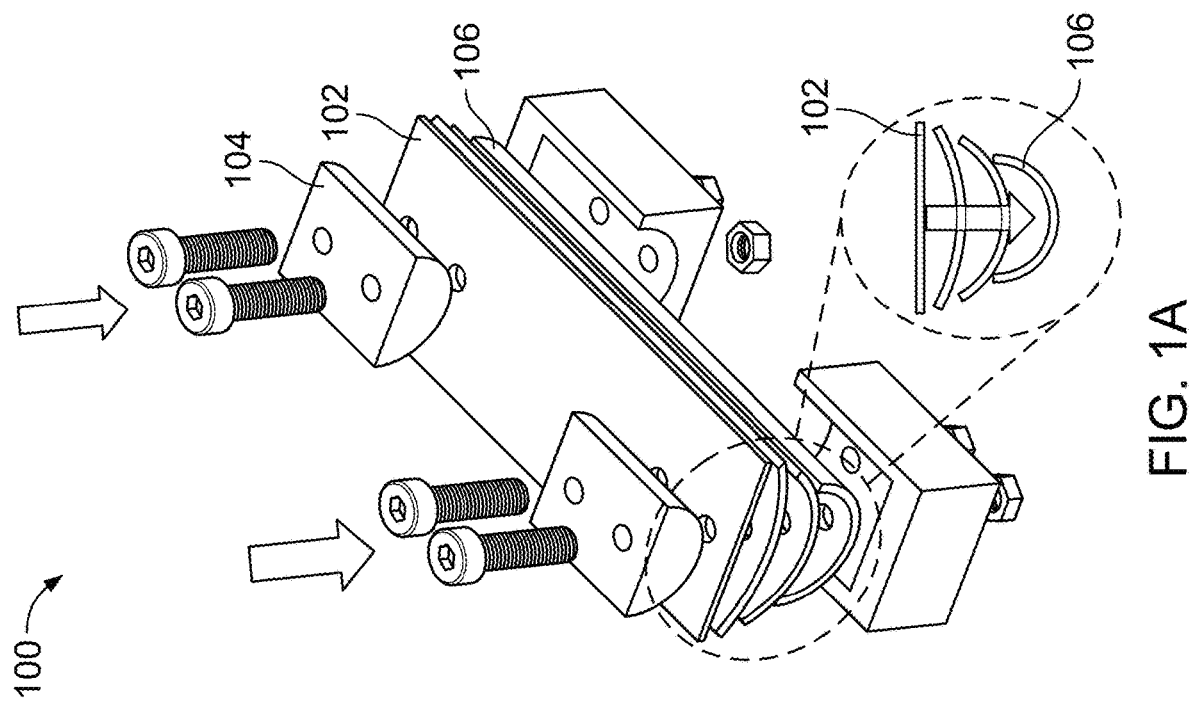
FIG. 1A depicts a mechanism used to introduce curvature into beams.

Buckling is a condition in which small geometric perturbations lead to drastic reductions in load-carrying capacity in structural systems. FIG. 1A depicts introduction of curvature into a beam. A flat, slender, compliant beam 102 shows little resistance towards bending. However, by using a template 104 to apply force to the beam 102, the resulting curved beam 106 resists bending in the direction opposing its camber (known as opposite sense bending) more than when the curved beam is bent in the direction of the beam's camber (equal sense bending). The influence of curvature results in different buckling limits in equal and opposite sense bending as well. Furthermore, this phenomenon is also controllable by considering the effective length of the curved beam, as shown in plots provided in FIG. 1B for a short curved beam 110 and a long curved beam 112. When a curved beam with a shorter effective length is subjected to a load, both the stiffness and buckling occur more symmetrically, and beam stiffness is larger, when compared to a curved beam with a longer effective length subjected to a load.

Figure 2A:
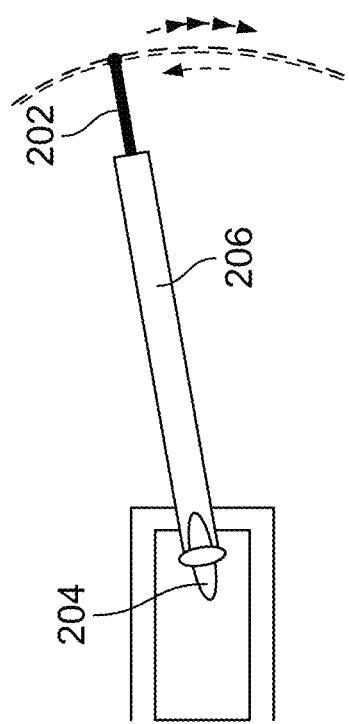
FIGS. 2A-2D depict different methods to achieve net thrust in rowing or flapping gaits.
Figure 2B:
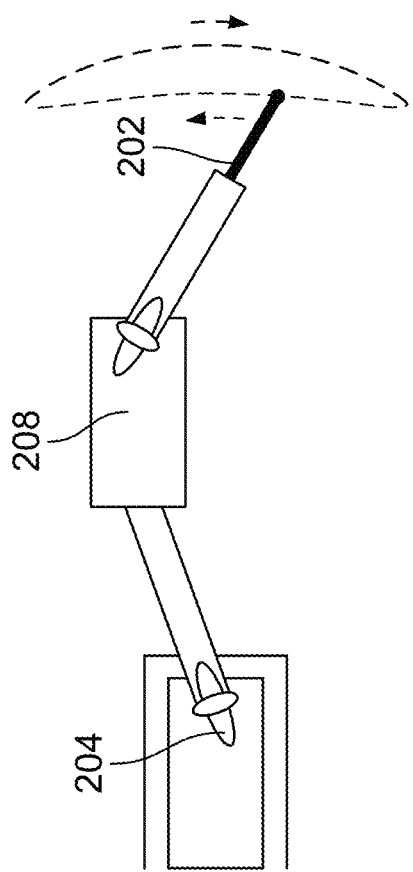
Figure 2C:
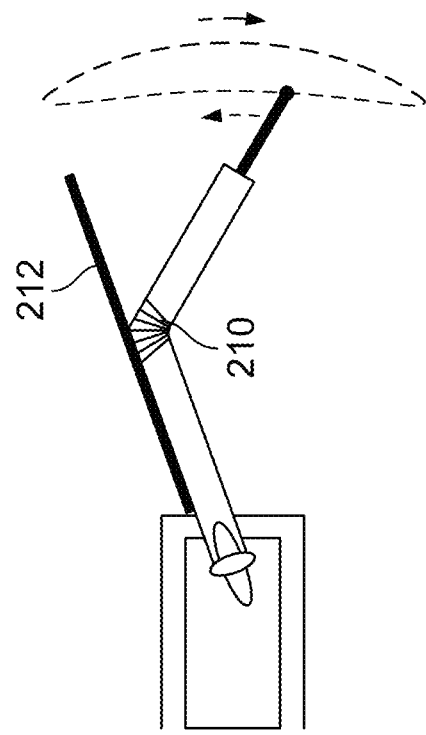

FIGS. 2A-2D depict different methods to achieve net thrust in locomotion. FIG. 2A depicts a mechanism in which the beam does not buckle. The fin (or wing) 202 is coupled to a motorized joint 204 by a rigid beam 206. Nonzero net thrust or movement is produced by a faster power stroke in a first direction (e.g., downward) and a slower recovery stroke in a second direction that can be opposite the first direction (e.g., upward). FIG. 2B depicts the use of a multi-actuation system to reconfigure the beam for recovery. In this mechanism two motorized joints 204 and 208 are used. This approach introduces the trajectory hysteresis needed for locomotion but can suffer from higher complexity as well as a heavier and less efficient system. FIG. 2C depicts a soft robotic approach that uses a flexible joint 210 alongside rigid joint limit 212 to produce positive net thrust and moment. The deformation of flexible joints during recovery repositions the fin to reduce drag, while rigid joint limits prevent bending during the power stroke, keeping the fin system better-positioned to push against the surrounding fluid. This approach, while effective at reducing control complexity, is not actively reconfigurable.

Figure 2D:
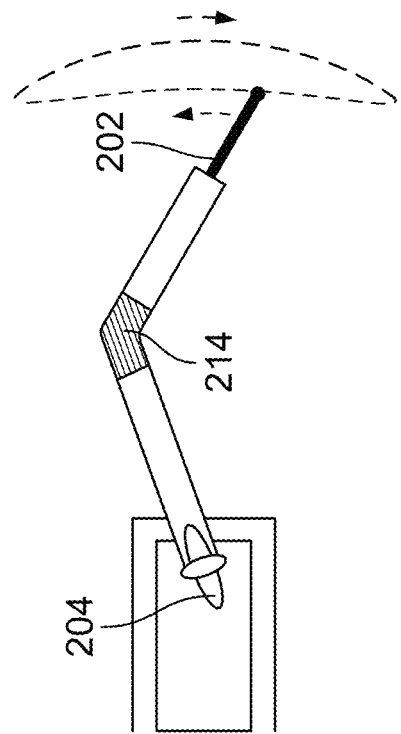

Referring to FIG. 2D, this disclosure describes passive rowing using curved beams 214 that preferentially buckle within a rowing or flapping cycle. This fin system design produces net thrust and moments through symmetric sinusoidal actuation of a single actuator, resulting in a simple and energy efficient approach. Moreover, the characteristics of slender curved beams provide an opportunity to tune the system's dynamic behavior by altering its stiffness as shown in FIG. 1B. By changing the effective length of a curved beam, the buckling can be inhibited unidirectionally or bi-directionally, enabling a switch between a rowing gait with a net forward thrust (when actuated as a pair) and a flapping gait, generating lateral thrust. When a pair of such fins are used together, a number of other swimming modalities may be observed as well. This tunability, which is made possible through internal reconfiguration of the curved beam, splits the use of actuators according to their purpose—power and reconfiguration, permitting the use of machine learning approaches to find optimal gaits for different swimming modalities in a decoupled fashion, where tuning actuators are first determined, with a subsequent, independent optimization of the power actuator signal.

FIGS. 3A-3D illustrate the function of a fin (or wing) mechanism. FIG. 3A shows a load/displacement curve for a fin system 302 shown in FIG. 3B. A fin 304 is coupled to an electric servo motor 306 by a compliant, curved beam 308 that buckles at two different locations along the positive 310 and negative 312 portion of its load/displacement curve, corresponding to opposite and equal sense bending directions. FIG. 3A shows that controlling the amount of force exerted on the end of the curved beam in positive and negative directions can avoid buckling in both directions, permit buckling in one direction, or buckle the curved beam in both directions. The curved beam is bistable. When actuated in a fluid such as air or water, dynamics of powered, symmetric flapping can result in general cyclic flapping patterns, as depicted in FIGS. 3B-3E. A first regime is typified by slow flapping below the buckling limit in either direction, where drag and inertial forces remain low, shown in FIG. 3D. In this case, the curved beam 308 acts like a simple bending beam. Referring to FIG. 3E, little asymmetric behavior is observed in its flapping path or in the average thrust generated over a cycle. In a second regime, depicted in FIG. 3B, the flapping velocity is sufficient to buckle the curved beam 308 in the equal-sense bending direction but not in the opposite direction. This results in the curved beam 308 undergoing large deflections about the buckling point during roughly half of its flapping cycle, which allows the larger surface area of the fin 304 to travel nearly parallel with the direction of motion, rather than perpendicular. This different angle of attack can result in reduced drag forces on the wing 304 during the recovery phase of the stroke. As the cycle reenters the power phase of the stroke, drag allows the wing to open back up in the other direction and remain perpendicular to the direction of motion. This difference in overall drag experienced by the wing in power and recovery phases generates nonzero average work over a single flapping cycle, depicted in FIG. 3C, even with a symmetric input from the motor 306, In a third regime, the curved beam buckles in both directions due at least in part to high torques exerted by the motor 306 that increase the drag and inertial forces experienced at the tip of the curved beam past the buckling limit in both directions.

FIGS. 4A-4D depict different locomotion mechanisms used for a swimming mechanical system (e.g., a robot) in a fluid (e.g., water). FIG. 4A depicts a flapping mechanism for a single fin 402, in which motion of the fin 402 is generally perpendicular to the direction of travel. The fin 402 is coupled to a curved beam 404. The curved beam 404 is coupled to a motor 406 that is configured to impart a flapping motion to the curved beam 404. The input from the motor 406 is symmetric. The curved beam 404 is configured to buckle at two different points along the positive and negative portions of its load/displacement curve, corresponding to opposite and equal sense bending directions, as shown in FIG. 3A. For the flapping mechanism, the load is maintained below the buckling limit of the curved beam 404 in the positive and negative portions of the load/displacement curve, and the curved beam 404 does not buckle. The dashed arrows indicate the direction of travel for the end of the fin 402, with movement in a first direction (e.g., downward or clockwise, as depicted by arrows p) defined as the power phase and movement in a second direction (e.g., upward or counterclockwise, as depicted by arrows r), defined as the recovery phase. The dashed lines indicate the position of the end of the fin 402 throughout the flapping cycle. For the flapping mechanism, the trajectory of the end of the fin 402 is the same for the power phase and the recovery phase. FIG. 4B depicts a rowing mechanism and is characterized by reciprocating motions directed generally parallel with the direction of travel. During the recovery phase of the fin 402, the load on the curved beam 404 is greater than the equal sense critical buckling limit, and the curved beam 404 buckles, reducing drag on the fin. Buckling of the curved beam 404 occurs only in the equal sense bending direction. The larger surface of the curved beam 404 travels substantially parallel with the direction of motion of the mechanical system. During the power phase, the load on the curved beam 404 is below the critical opposite sense buckling limit, and the fin 402 maintains full extension and experiences higher drag forces. The drag forces on the curved beam 404 in the power phase exceed drag forces on the curved beam 404 during the recovery phase, and this difference in drag forces generates nonzero average work over a rowing cycle. FIG. 4C depicts lateral swimming using one fin flapping. The dashed arrows depict the position of the end of the fin throughout the recovery and power phases. The wide arrow depicts the direction of motion of the robot. FIG. 4D depicts forward swimming using two fins 408 and 410 employing a rowing mechanism. The dashed lines depict the position of the end of the fins for the recovery (up) and power (down) phases, and the wide arrow shows the direction of motion of the robot. FIG. 4E depicts an undulating mechanism produced using two fins 412 and 414 driven by motor 416 in an asynchronous, symmetric flapping gait. The wide arrow depicts the direction of motion of the robot. FIG. 4F depicts a turning mechanism produced by driving only one fin at its optimal gait.

A servomechanism can be coupled to the curved beam 404 and the motor 406. The motor 406 can be configured to activate the servomechanism, and the servomechanism can be configured to impart the flapping motion to the curved beam 404. The servomechanism can be configured to impart the flapping motion by controlling an amount of force exerted on an end of the curved beam 404.

EXAMPLES

Figure 5:
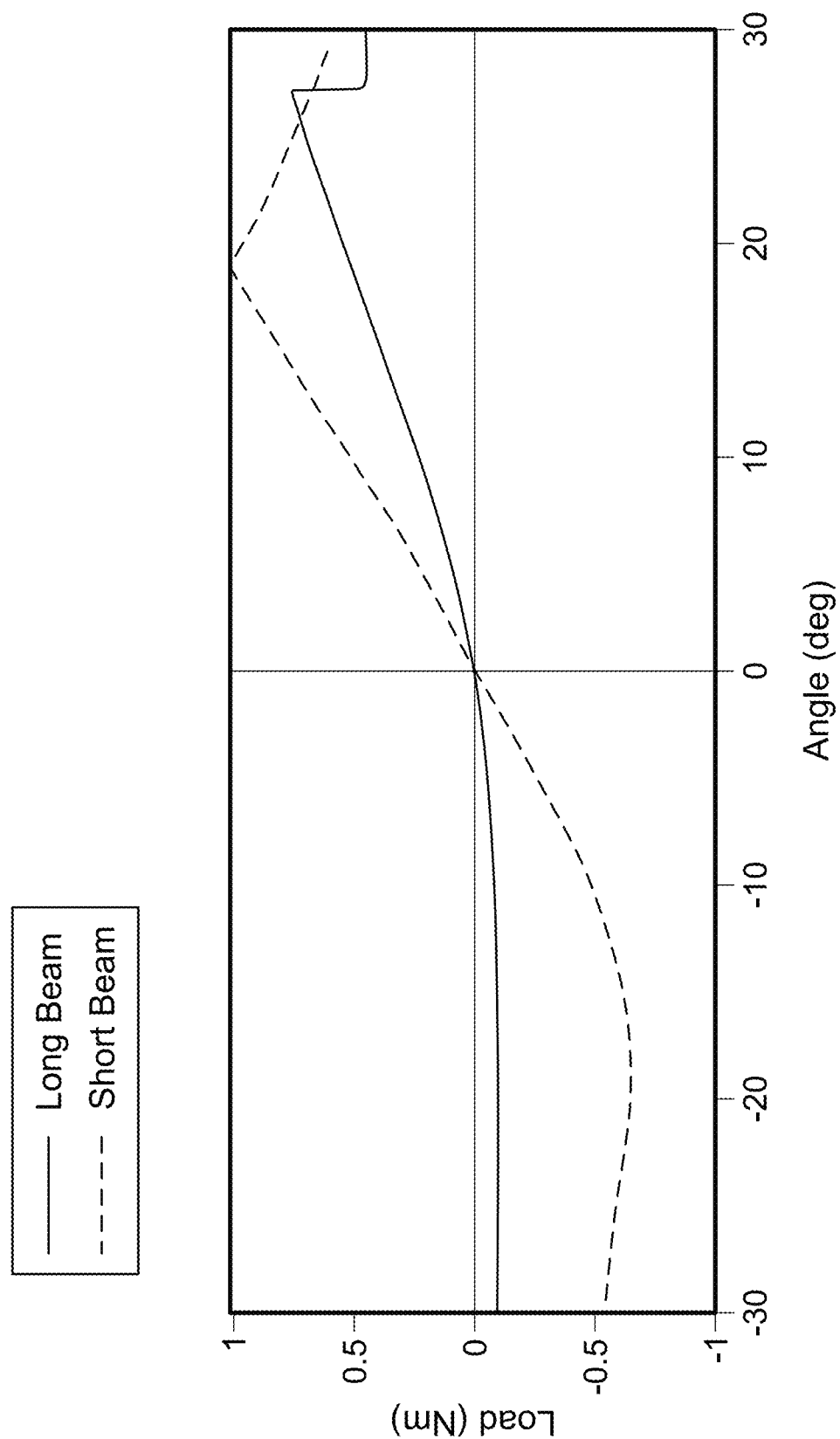
FIG. 5 shows a plot of the changing nonlinear behavior of curved beams with a short (dashed line) and long (solid line) effective length. The positive x-axis represents opposite-sense bending, while the negative x-axis represents equal-sense bending.

FIG. 5 shows the nonlinear behavior of two specimens with the same curvature (180°) and width (25.4 mm), and with effective lengths of 31.75 mm and 3.6 mm. For each specimen, the curved beam is coupled at one end to a fixed plate while a known force is applied to the other end. A force sensor mounted to the output of a linear actuator pushes on the curved beam by a small, 3D printed contact point. The linear actuator moves back and forth through a 50 mm range in 10 μm increments while forces and torques are logged. Since the curved beams are modeled as a flexible hinge, the sampled data is displayed by their equivalent torque and deformation angles. These data also show that by reducing the beam length, the critical buckling limit in equal sense bending increases from 0.1 Nm to 0.65 Nm. The limit for opposite sense buckling, however, increases from 0.76 Nm to 1.02 Nm. Thus, for fluid-dynamic loads between 0.1 Nm and 0.65 Nm, altering the effective length changes the buckling condition from unidirectional to bi-directional, resulting in the gait switching from rowing to flapping.

Figure 6:
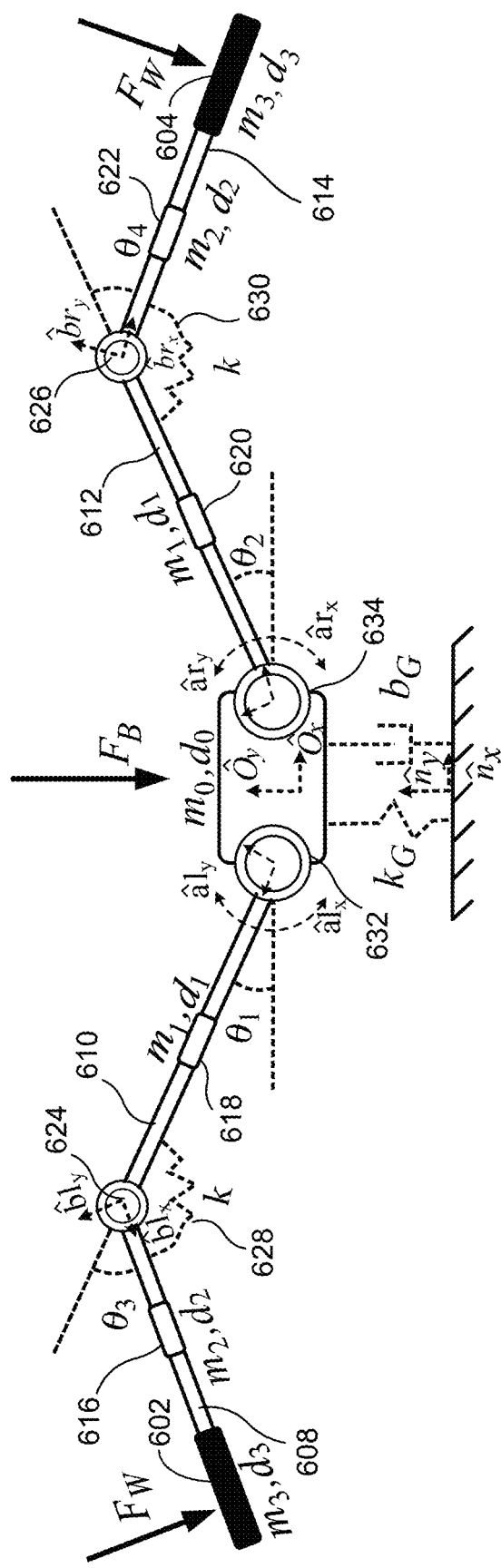
FIG. 6 depicts the model used for the swimming robot.

Dynamic modeling. The dynamics of the system are demonstrated by modeling the contribution of the wing's drag, the curved beam's stiffness (in the long configuration), and the inertial effects of each body. The model for the robot, depicted in FIG. 6, uses two fins 602 and 604 coupled to the main robot's body 606 at a distance of do. Each fin is represented by rigid links 608, 610, 612 and 614 ($d_1$, $m_1$ and $d_2$, $m_2$) with point masses 616, 618, 620, and 622 located at their centers of mass, coupled by pin joints 624 and 626 and torsional springs 628 and 630, with stiffness coefficient K, coupled in parallel. The nonlinear stiffness of the spring is represented by three linear regimes. The slopes of each of these regimes have been adjusted to best fit experimental data collected from the specimen in its long effective length configuration. Using the flat plate model, the forces on a fin due to a fluid are estimated by using equations can be derived from:

$$F_w = \rho u^2 A \sin \alpha, \quad (1)$$

where ρ, u, A, and α are the density of fluid, the relative velocity of the plate, the area of the plate, and the angle-of-attack of the wing, respectively. α is 0 when parallel to the flow and 90° when perpendicular (in two dimensions).

This force is perpendicular to the wing and acts as the fluid's dynamic load on the distal end of curved beam.

Using Eq. 1, the velocity of the plate (u) can be used to control the amount of drag force exerted on it, which, in conjunction with the load limits determined by the mechanics of the curved beam, determines whether and under what conditions buckling occurs. The flat plate model can best describe the fluid dynamics of a system when the Reynolds number is low and the system is in the laminar regime. Due at least in part to the simplicity of the flat plate model, it is used in the simulation to reduce computation time and keep the optimization process tractable. The simulation is performed with a Python-based dynamics package called Pynamics. This library derives the Equation of Motion (EOM) using Kane's method, which is then integrated to determine the system's state over time. The performance of the model is evaluated by comparing the moments generated by one fin against data collected experimentally. By defining two forces coupling the robot to the ground (kG and bG in FIG. 6), the forces and moments exerted on the environment about the rotational axis when one fin is actuated can be measured in simulation.

When a sinusoidal input torque is applied to the base joint of a fin, the dynamic model demonstrates that the wing system transitions between a non-buckling flapping regime to a one-sided buckling regime when the input frequency increases. From the modeling data, the wing system transitions from the non-buckling regime to one-sided buckling at around 0.3 Hz, where the maximum positive torque increases with frequency in the power stroke, but the maximum negative torque in the recovery section remains low. Data in Table 1 show an acceptable correlation between the generated torques in this test and the values estimated by the dynamic model. Based on this performance, robot swimming is simulated by removing the forces holding the robot's main body ($k_G = b_G = 0$). A drag force acting on the main body is also considered.

TABLE 1

Torques (in Nm) generated in simulation and experiment

| Frequency | Simulation | | Experiment | | Buckling |
|---|---|---|---|---|---|
| | $\tau_{min}$ | $\tau_{max}$ | $\tau_{min}$ | $\tau_{max}$ | |
| 0.1 | −0.04 | 0.04 | −0.04 | 0.04 | No |
| 0.2 | −0.14 | 0.14 | −0.14 | 0.15 | No |
| 0.3 | −0.23 | 0.3 | −0.13 | 0.32 | One side |
| 0.4 | −0.24 | 0.46 | −0.12 | 0.44 | One side |

Design optimization. Using the dynamic model introduced above, the design that maximizes forward swimming speed for symmetric rowing gaits can be found. In the optimization, the lengths of the fin's links and the distance between the robot's drive motors 632 and 634 are considered ($d_1$, $d_2$, $d_3$ and $d_0$ in FIG. 6). The mass of each link is based on measurements of physical prototypes. Actuator inputs are optimized simultaneously. The torques at motorized joints track desired angular trajectories ($\theta_1$ and $\theta_2$ in FIG. 6) by $k_G$ and $b_G$ as mentioned previously. Input signals are supplied as a pair of sinusoidal functions, $$\theta_1 = \beta_1 + \alpha_1 \sin(2\pi f_1 t)$$

$$\theta_2 = \beta_1 + \alpha_2 \sin(2\pi f_2 t + \varphi) \quad (2)$$

where $\theta_i$ is actuator i's angle, and $\beta_i$, $\alpha_i$, $f_i$, and $\varphi_i$, are the sinusoidal signals' angular offset, amplitude, frequency, and phase shift, respectively. In order to have synchronized rowing gaits for the purposes of forward rowing, these parameters are set to $\alpha_1 = -\alpha_2$, $\beta_1 = -\beta_2$, $f_1 = f_2$, and $\varphi = 0$. Based on the design and input gaits parameters introduced above, there are at least seven parameters affecting the robot's swimming speed. A numerical optimization approach using an evolution strategy has been selected for finding the optimal parameters. While the parameter space can be searched for lower-dimensional problems, CMA-ES can be used as a way to find ideal parameters within a seven-dimensional space.

CMA-ES is an evolution strategy that uses stochastic methods to numerically solve nonlinear and non-convex optimization problems. Using an evolution strategy like CMA-ES in practical experiments can have advantages compared to other meta-heuristic and search-based algorithms. CMA-ES is a suitable example of an optimization tool in robotics due at least in part to its short evaluation time compared to other strategies, which has practical benefits including increasing the service life of motors, bearings, and gears that can become worn or damaged during training.

In the optimization process, the cost function can be defined as the negative of the swimming range that robot achieves in 10 seconds. The following assumptions and constraints are used to simplify the optimization process:
Assumptions: (i) Water drag is applied to the main body 606 and fins 602 and 604 ($F_B$ and $F_W$ in FIG. 6), but not to the links. (ii) Drag is applied to the center of each geometry. (iii) Fins and main body have rectangular cross-sections with 80 and 50 mm widths, respectively. (iv) The robot body's mass, mostly driven by the mass of servos and electronics, is assumed to be constant.
Constraints: (i) Variables remain within the ranges defined by Table 2. (ii) The total length of the robot is under 560 mm (to fit the water tank). (iii) Actuation speed and power remain within the servo's nominal speed and power range. (iv) Loads on the curved beam remain below opposite sense critical load. (v) Design and gait parameters do not collide during actuation.

TABLE 2

Parameter range in design and input optimization

| Parameter | Range | Parameter | Range |
|---|---|---|---|
| $d_0$ (mm) | 40-160 | $d_1$ (mm) | 30-160 |
| $d_2$ (mm) | 30-160 | $d_3$ (mm) | 30-160 |
| $\alpha$ (deg) | 0-90 | $\beta$ (deg) | −90-90 |
| f (Hz) | 0.1-1.2 | $\varphi$ (deg) | 0-359 |

A penalty function is defined to exclude nonfeasible solutions, in which a large positive value proportional to the number of violated constraints is returned. The penalty function gradually restricts the large search space to converge within the feasible solution space of the problem. For feasible solutions, the dynamic simulation runs and the cost function returned. The results converged after 25 iterations, revealing that designs with a smaller distance between the fins ($d_0$) as well as smaller second link length ($d_2$) are preferential for maximizing swimming speed. The optimal design parameters (in mm) are $d_0=40$, $d_1=112.1$, $d_2=30.2$, and $d_3=114.2$.

FIG. 7A shows an embodiment of a swimming robot 700 using the above design parameters. Two Hitec D646WP waterproof servo motors 702 and 704 actuate the input joints. A slider mechanism including a pulley 706 and compression springs 710 and 712 control the position of sliders 714 and 716 with curved slots. The curved beams 718 and 720 are coupled to the fins 722 and 724. The lengths of the rigid parts are calculated assuming that the curved beam bends at the midpoint. This assumption is made based on the observation of the curved beam bending underwater. The rigid links are 3D printed from Onyx. The fin is cut from 0.76 mm fiberglass sheets.

The slider mechanism alters the effective length of the curved beam based on the position of the sliders 714 and 716 relative to the curved beams 718 and 720. In the configuration depicted in FIG. 7A, the curved beams 718 and 720 are exposed and the curved beams are in a neutral buckling position. The sliders' neutral configuration is set by the compression springs 710 and 712 as the beam's natural length, which allows one-sided buckling—and thus rowing—at lower forces. To activate flapping, a single actuator coupled to pulley 706 pulls both fins' sliders 714 and 716 forward over the curved beams 718 and 720 by a tendon and pulley system, inhibiting buckling when the beams are loaded. The curved beam's stiffness in this configuration is higher and more symmetric (in the equal and opposite sense), as seen in the dashed line in FIG. 5. By using the slider mechanism, the characteristics of the buckling wing can be actively reconfigured during use. FIGS. 7B and 7C show the position of the slider 714 for a long and short effective beam length, respectively.

Experimental Gait Optimization. Optimal gaits for various swimming maneuvers have been determined using the robot shown in FIG. 7A, which was based on the optimal results obtained from simulations. To evaluate the performance of each gait, a test apparatus was implemented to sample the thrust and moment generated by the fins, or the swimming distance and speed. A linear carriage running on a rail is installed on the top of a 4×2×2 ft$^3$ tank (length× width×height). The robot's position was measured using an OptiTrack motion tracking system. An ATI Mini-40 force/torque sensor was coupled to the carriage; its distal connector coupled to the robot by an aluminum extension arm that held the robot underwater. An optimization process was then performed using CMA-ES to find the optimal parameters of each desired gait by determining optimal parameters for control rule.

Rowing Gaits: In this optimization process, the robot swam 5 seconds with the curved beam in its long configuration shown in FIG. 7B. The distance traveled in that time was then measured. A servo and pulley resets the carriage to its initial position at the end of each trial. In order to protect the curved beams from damage due to gaits that exceed a safe operating range, a joint limit was temporarily coupled during the optimization process, and optimal gaits were then re-tested once they are determined to be safe. The forces generated during recovery stroke were limited to −1 N, while the power stroke achieved 7.5 N thrust at its peak.

Flapping Gaits: By reducing the effective length of the curved beam 718 using the slider configuration shown in FIG. 7C, its stiffness increases in both the opposite and equal-sense directions, changing the curved beam's behavior to be both stiffer and more symmetric. Using this phenomenon, lateral thrusts can be generated by flapping one limb ($\alpha_2=\beta_2=f_2=0$) with a sinusoidal input while maintaining a neutral offset in the other ($\beta_1=0$). A new set of optimal gait parameters was obtained by searching through the resulting two-dimensional space of gait parameters, but the lateral thrust found by this approach was unable to overcome rail stiction. As such, a thrust-based metric was adopted. The result shows that a flapping gait with relatively large input amplitude ($\alpha=87°$) and low frequency (f=0.3 Hz) is optimal.

By commanding both limbs to perform asynchronous, symmetric flapping gaits ($\varphi\neq0°$), the robot swimming mode changes to undulation as depicted in FIG. 4E, similar to snakes, eels, and Purcell's three-link swimmer. The three-dimensional space of input parameters related to undulation was searched to obtain the highest lateral thrust undulating gait that exceeds the lateral single-limb maximum swimming speed found above. Stiction was addressed by a free-swimming prototype that was constructed by mounting the swimming mechanism to a floating platform that ensures the fins stay underwater, while keeping power electronics above the water. Using the optimal gaits obtained from the experimental search, the untethered robot's performance was evaluated.

Using the optimal rowing gait, the robot achieves a forward swimming speed of about 0.32 m/s. The swimming distance per rowing cycle is around 0.6 m. The robot is also able to turn, as depicted in FIG. 4F, when only one limb is commanded by the same optimal gait. The turning speed is 25.7 deg/s. When flapping, the untethered robot achieves a lateral swimming speed of 0.17 m/s when only one limb is actuated. When undulating as depicted in FIG. 4E, the robot achieves a swimming speed of 0.16 m/s. It was observed that, while the thrust data is better for an undulating strategy, the swimming speed of the untethered robot was lower than others, which is attributed to the higher drag of the floating platform when rotating.

Figure 8A:
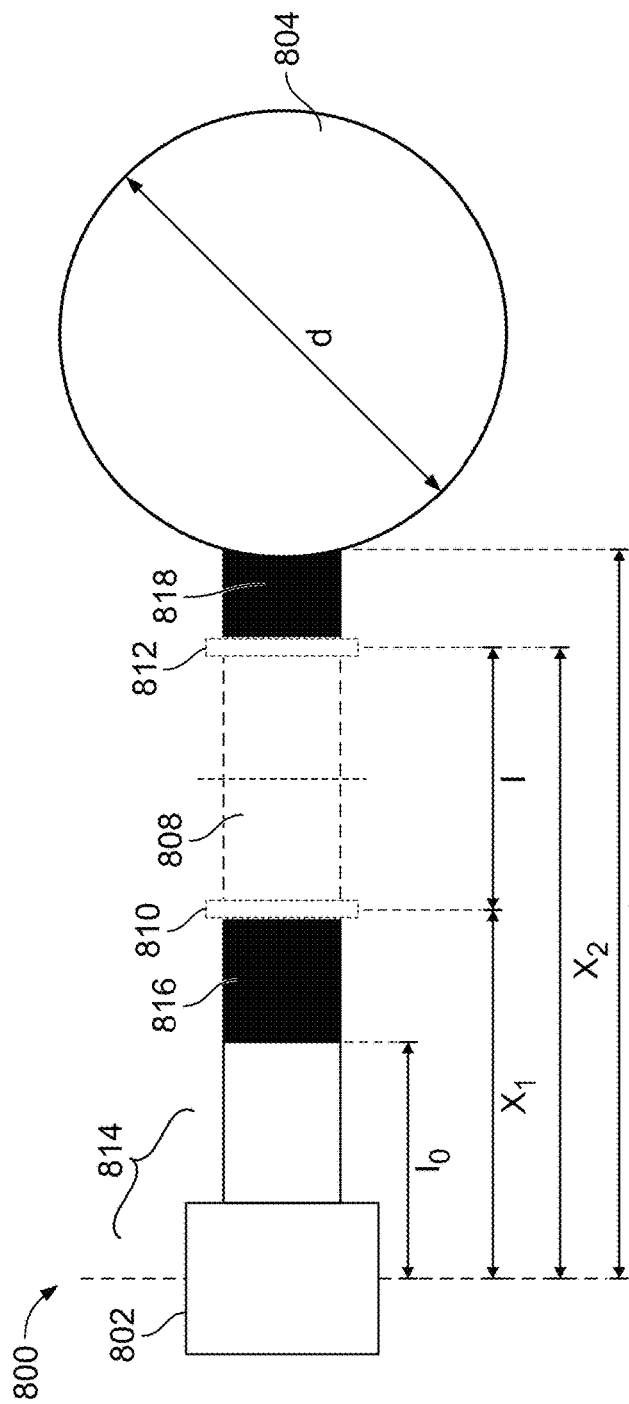
FIG. 8A depicts a side view of a flapping wing design.
Figure 8C:
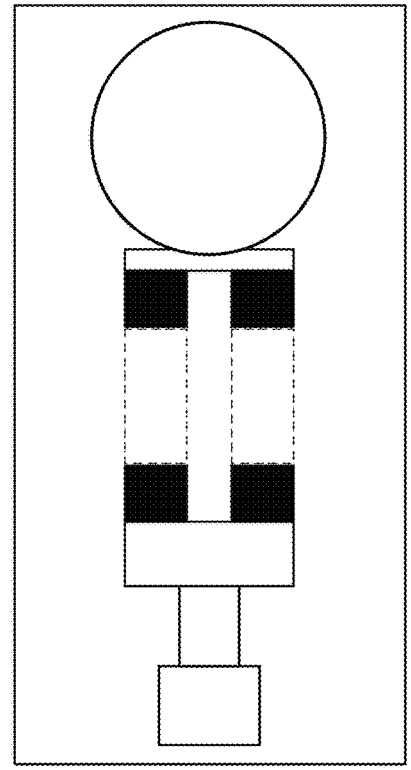
FIG. 8C depicts a two-beam design.
Figure 8B:
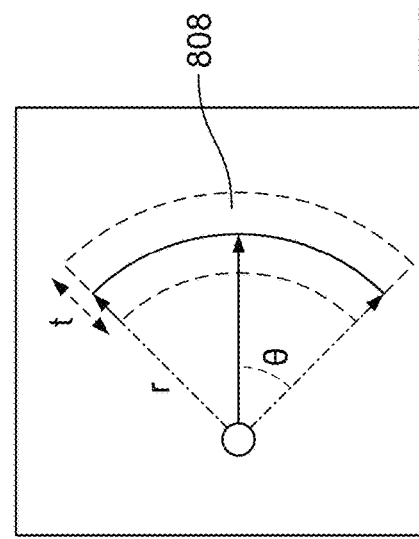
FIG. 8B depicts the curved beam cross-section.

Analysis of Curved Beam in Anisotropic Buckling Wings. Components of anisotropic buckling wings are described, focusing on modeling and characterization of curved beams embedded in these wings. To split the problem between aerodynamic and buckling domains, a wing system 800 was modeled as shown in FIG. 8A. The model is based on a long thin beam coupled to a circular flat plate. This wing system 800 is coupled to a joint 802 that can be powered by a motor or transmission. The role of the circular plate 804 is to produce thrust and drag and apply resultant forces and torques through the curved beam 808 to the body of a mobile robot. The curved beam 808 is curved along its length by two curved sliders 810 and 812. A symmetric propulsion allows the impact of buckling and deflection on thrust and force production as a function of wing configuration throughout its gait cycle. FIG. 8B depicts a cross-section of the curved beam 808 with dimensional parameters. FIG. 8C depicts a double beam design.

Buckling under the assumption of end-loading conditions consisting of point loads and moments can be modeled from aerodynamic forces in the distal portion of the wing. The wing model depicted in FIG. 8A comprises several sections: a rigid plastic section 814 of length $l_0$, a section 816 of length $(x_1-l_0)$, a curved beam 808 of length $(l=x_2-x_1)$, and a third section 818 of length $(l_1-x_2)$, which is coupled to a circular plate 804 of diameter d. The curved beam 808 has a thickness t. The two curved plastic sliders 810 and 812 are located at $x_1$ and $x_2$. These sliders induce a camber to the beam, which can be represented as a radius of curvature r. The sliders 810 and 812 and curved beam 808 of the wing are made of a single sheet of t-mm-thick polyester, whereas the rigid plastic section 814 containing the joint 802 is a sufficiently rigid 3D printed plastic. For the purposes of design and analysis, it is assumed that the position of sliders 810 and 812 is such that the curved beam 808 is the weakest and buckles first in the presence of flapping forces. Though camber of the wing may be observed along the beam, the circular plate 804 does not exhibit significant curvature due to increased material stiffness.

Theoretical Model for Curved Beam Buckling. Two different formulations are typically used to describe the buckling phenomenon of curved beams, namely the buckling of spherical shells and the behavior of folded tape-springs.

The buckling of spherical shells can be described as follows. In opposite sense bending, prestressed, curved material first passes through a flattened state via moments exerted on the shell's edge ($M_x$ and $M_y$). Stress ($\sigma_y$) is the direct result the of curvature change in the y-direction, whereas ($\sigma_x$) is caused by Poisson's ratio. Considering that the material remains in its elastic range during this deformation, the stress distribution through the thickness stays linear and stress distribution can be determined.

This model finds critical buckling stress as a function of curvatures of the two stable phases, i.e., initial longitude curvature and final phase curvature. In this analysis, the system has no second stable phase. As a result, the value for final phase curvature is unknown and the value for critical buckling moment cannot be obtained based on this system of equations.

Figure 9A:
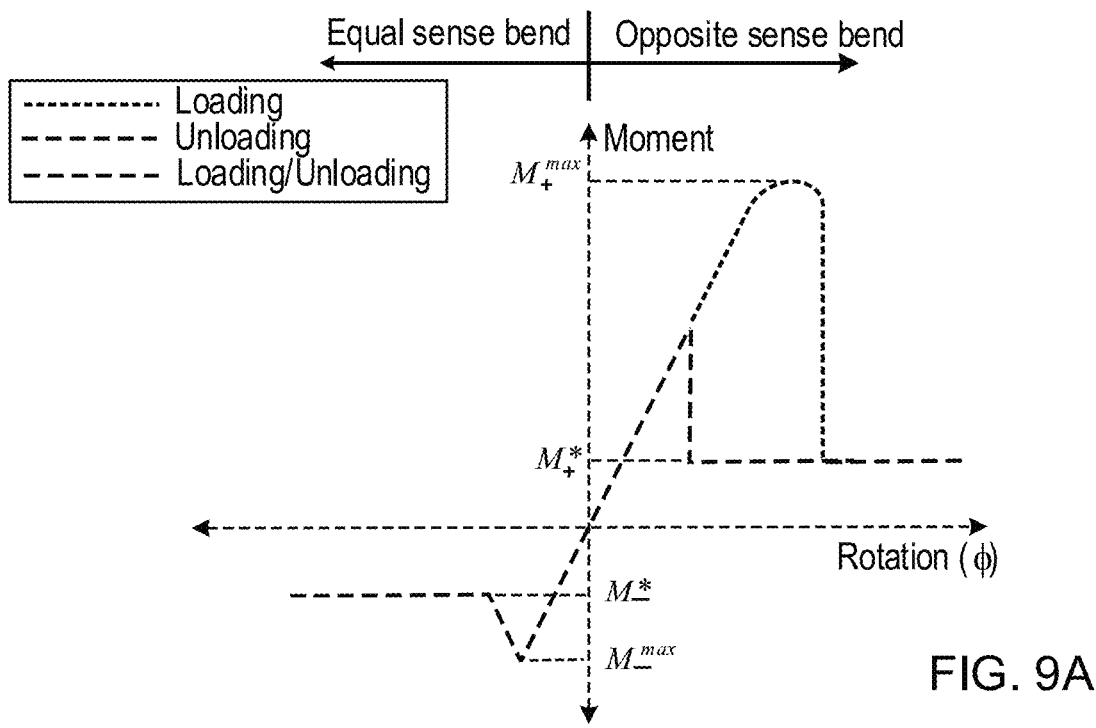
FIGS. 9A and 9B show plots of nonlinear behavior of a curved beam derived from theory and experimental data, respectively, for a steel and plastic specimen with the same geometry. Both results show a decrease in stiffness after buckling occurrence both in opposite and equal-sense bending.

FIG. 9A shows the moment-curvature relationships for a tape spring subject to equal and opposite end moments. End moments can be obtained by integrating of moments about the transverse axis for the whole cross section of the tape spring by considering the beam as a slightly distorted axi-symmetric cylindrical shell. In this formulation $$M = \int_{-\frac{s}{2}}^{\frac{s}{2}} (M_l - N_l w) dy = sD \times \left( k_l + \frac{v}{r} - v\left(\frac{1}{r} + vk_l\right)F_1 + \frac{1}{k_l}\left(\frac{1}{r} + vk_l\right)^2 F_2 \right) \quad (3)$$

where $M_l$ and $N_l$ are the bending moment per unit length and the axial force per unit, respectively. w represents out-of-plan deflection, the y-axis corresponds to the longitudinal direction, and $k_l$ is longitudinal curvature. The variables s and D are the width of the tape spring and bending stiffness, respectively and can be determined by the following equations:

$$s = 2r^2 \sin\left(\frac{\theta}{2}\right) \quad (4)$$

$$D = \frac{Et^3}{12(1 - v^2)} \quad (5)$$

where E, v, and t are Young's modulus, Poisson's ratio, and tape spring thickness, respectively. r and $\theta$ are the initial transverse radius and curvature angle of tape spring, respectively. $F_1$ and $F_2$ are calculated as follows:

$$F_1 = \frac{2}{\lambda} \frac{\cosh\lambda - \cos\lambda}{\sinh\lambda + \sin\lambda} \quad (6)$$

$$F_2 = \frac{F_1}{4} - \frac{\sinh\lambda \sin\lambda}{(\sinh\lambda + \sin\lambda)^2} \quad (7)$$

$$\lambda = \frac{\sqrt[4]{3(1 - v^2)s}}{\sqrt{\frac{t}{k_l}}} \quad (8)$$

The critical buckling moment ($m_+^{max}$), can be calculated by finding the maximum end moment in Eq. 3. The "steady moments" $M_+^*$ and $M_-^*$ can be calculated by considering that the curved region is approximately cylindrical $$M_-^{max} = (1+v)D\theta \quad (9)$$

$$M_+^{max} = -(1+v)D\theta \quad (10)$$

This formulation is limited to the linear regime of the material's stress/strain curve.

To evaluate the theoretical model and provide better understanding of the curved beam, two specimens of a steel measuring tape and a curved polyester beam were considered. Both specimens have the same length (l). The polyester specimen is precurved so as to have the same radius of curvature (r) as the steel specimen. For each specimen, the curved beam is coupled at one end to a fixed plate, while a known force is applied to the other end. A force sensor mounted to the output of a linear actuator pushes on the beam via a small, 3-D printed contact point. The linear actuator moves back and forth through a 50 mm range in 10 μm increments; applied forces are sampled at each step.

Figure 9B:
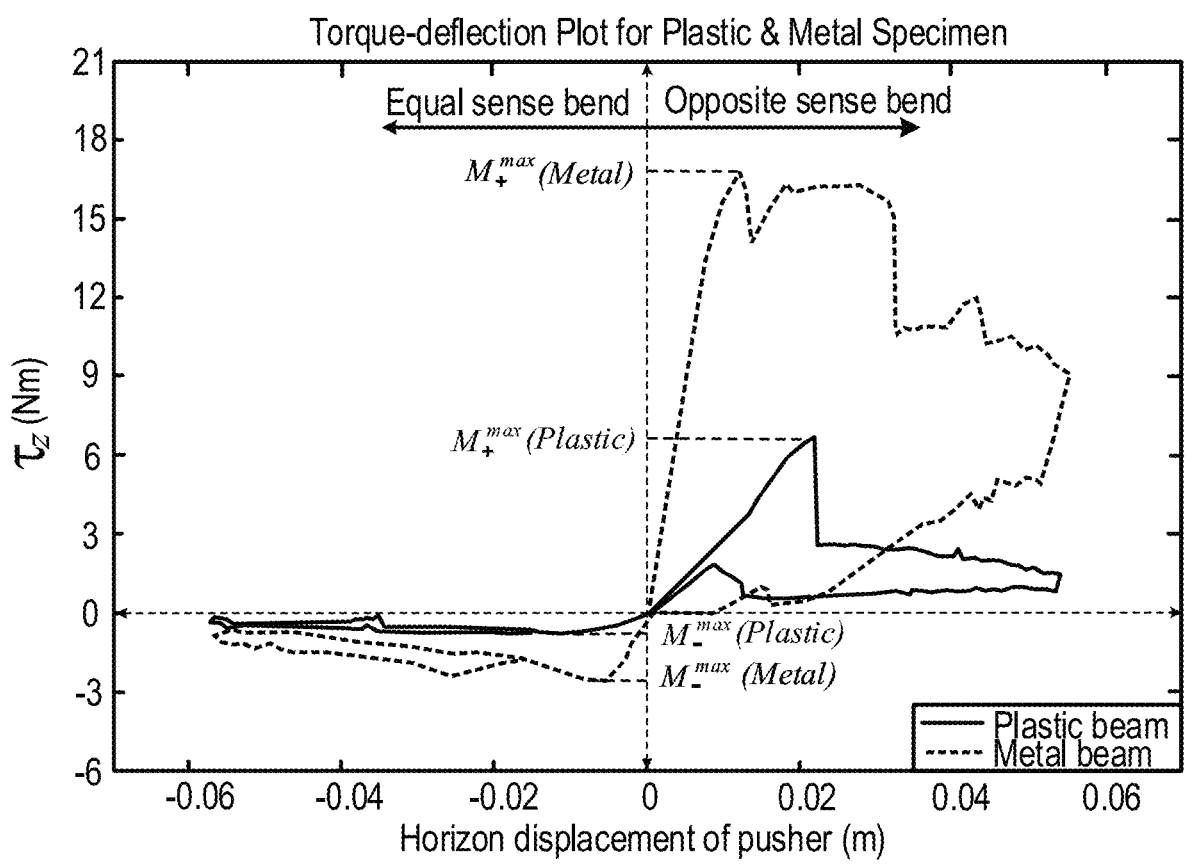

FIG. 9B depicts the result for both specimens in two cases of equal and opposite-sense bending. Both polyester and steel specimens exhibited the buckling behavior predicted in the theoretical model. This may be seen in the sudden drop in the resultant moment at high deflection. The buckling moments in opposite sense bending ($M_-^{max}$) are much higher than the equal-sense buckling moment ($M_+^{max}$) for both specimens. However, there are some notable differences between the theoretical model and experimental data. In both specimens, the deflection of the specimens in FIG. 9B does not follow the same path after buckling when forces are removed. This difference is more noticeable in the steel specimen compared to the polyester specimen. In the steel specimen, the values for $M_+^*$ and $M_+^{max}$ are different, but in the polyester specimen, they have the same value. The sudden change in the experimental torque/displacement data may to be due to out-of plane deformation, pusher slip, and friction. Moreover, in the case of opposite-sense bending, the path during loading and unloading of the polyester specimen is closer to earlier theoretical model predictions than the steel specimen. This is attributed to plastic deformation that was observed in the steel specimen. While the theoretical model assumes that the buckling beam does not leave the elastic region, this analysis shows otherwise. This can be due to the fact that, like the drag force on the wing, the pusher produces a combination of force and moment on the edge of the curved beam instead of a pure moment. This force-moment combination produces a nonuniform stress distribution on the shell and, in some cases, deforms the plate after buckling in ways not predicted the earlier models. This deformation results in permanent damage to the beams if the moment exceeds ($M_-^{max}$). As a result, a safe region must be defined for the moment produced by the wing to ensure that the beam never undergoes opposite-sense buckling.

Finite Elemental Analysis (FEA) Study on Curved Beam Buckling. In order to customize the buckling behavior of curved beams, various design parameters depicted in FIGS. 8A and 8B can be adjusted, including the radius of curvature (r), beam width ($r_\theta$), beam length (l), and other material properties. Finite Elemental Analysis (FEA) may be used to predict the relationship between these parameters and the desired buckling conditions. Unlike the analytical formulation, which is based upon uniform geometry and specific loading assumptions, FEA methods permit use of a wider range of geometries with more nuanced loading combinations.

The behavior of a slender curved beam was analyzed by varying the curvature ($\theta$), length (l), and width ($r_\theta$) of the beam as primary design parameters. The change in buckling factor of safety was monitored in linear, eigenvalue-based approach. To simplify the analysis model half the beam was modeled and a symmetric constraint was applied for the other half; a curvature-based mesh setting was used with a maximum element size of 0.4 and 0.02 mm tolerance. The proximal edge of the beam was fixed while a load is applied to the distal end. The load was a combination on nominal force and moment (1 N and 1 Nm).

First, it is demonstrated how adjusting the camber (or longitudinal curvature) of a beam can be used to alter the beam's stiffness and critical load to produce asymmetric flapping cycles and nonzero thrust. The curvature, θ, is defined in FIG. 8B so that θ=0 corresponds to a flat plate and θ=180 produces a half-cylinder. Using the results of an FEA calculation the deflection of a curved beam (of dimensions l=25.4 mm by $r_\theta$=25.4 mm by t=1 mm) loaded in equal and opposite sense differs noticeably.

The evolution of the differences in critical load for equal and opposite-sense bending was analyzed when the curvature of a beam is varied between 30° and 180°. The width ($r_\theta$) and length (l) of the undeformed half-beam was set to 25 mm, and the resulting critical loads were obtained when loads are applied in the equal and opposite orientation using a linear eigenvalue-based analysis. While exceeding the opposite-sense buckling limit leads to plastic deformation, exceeding the equal-sense buckling force reduces drag in the up-stroke portion of the swimming gait and increases the average thrust produced in swimming gaits without leading to beam failure.

To further analyze the relationship of beam width on buckling point, the curvature (θ) and length (l) of the undeformed beam were fixed at 180° and 25.4 mm, respectively, whereas the width of the beam is varied from 6.4 to 76.2 mm. The beam's, radius of curvature (r), volume, and mass change as a function of width. The result show the factor of safety corresponding to both equal and opposite-sense buckling increases as the width of the beam grows. The results also show that the difference in magnitude between equal and opposite-sense buckling limits grows with width.

In order to better understand how beam length (l) impacts buckling, the length of the beam was varied from 6.4 to 76.2 mm while keeping the curvature (θ) and width ($r_\theta$) of the undeformed half-beam fixed at 180° and 25.4 mm, respectively. The beam's volume and mass change as a function of length (l) while the radius of curvature (r) was held constant. Loading conditions were varied as a function of l in this since the loading conditions on the buckling portion of the system are defined by the moment and force combination generated by the forces exerted at the distal end of the beam.

The result of this analysis showed that the buckling limit decreases for both equal and opposite-sense buckling as the length grows. However, the difference between the magnitude of positive and negative buckling limits initially grows and then stays somewhat constant for l>25.4 mm.

Based on these results, a curved beam with θ=180° was selected for the rest of the analysis. The beam length (l), width ($r_\theta$), and thickness (t) remain free design variables that can be tuned in order to maximize the effects of one-sided buckling for use in conjunction with the drag and inertial forces acting on the fin across fluids of different viscosity.

Figure 10A:
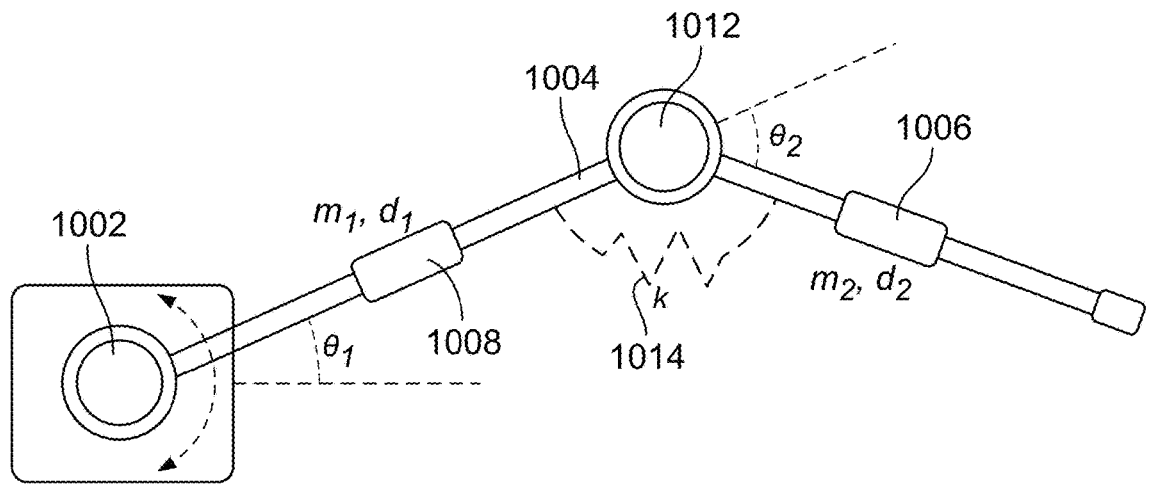
FIG. 10A depicts the model used for a single wing system.

Dynamic Modeling of Buckling Wing Propulsion. The dynamic behavior of a wing system was modeled by considering dynamic elements such as wing drag, curved beam stiffness, and rigid body dynamics. In this analysis, a model wing system shown in FIG. 10A is coupled to the ground at the base of the input joint 1002, and the moments exerted on the environment about the rotational axis are recorded similar to the described experimental setup. The system is represented by two rigid links 1004 and 1006 with point masses 1008 and 1010 located at their centers of mass, coupled by a pin joint 1012 and torsional spring 1014, with stiffness coefficient of K, coupled in parallel. The nonlinear stiffness of the spring is represented by three linear regimes; the slopes of each of these regimes have been adjusted to best fit experimental data collected from the prototype. The length ($d_1$ and $d_2$) and mass ($m_1$ and $m_2$) of each link match the measured values of the in-water prototype.

Using a flat plate model, the forces on a wing due to a fluid are estimated by the equations derived from:

$$F_{wD}=\rho u^t A \sin^2\alpha \qquad (10)$$

$$F_{wL}=\rho u^2 A \cos\alpha \sin\alpha \qquad (11)$$

where ρ, u, A, and α are the density of fluid, the relative velocity of the plate, the area of the plate, and the angle-of-attack of the wing, respectively. $Fw_D$ and $Fw_L$, correspond to the drag and lift elements of the aerodynamics forces on the plate. This model estimates the total force on a flat plate as $$F_w=\rho u^t A \sin\alpha \qquad (12)$$

where α is 0 when parallel to the flow and 90° when perpendicular (in 2-D). This force is perpendicular to the wing and acts as the aerodynamic load on the curved beam.

Using Eq. 12, the velocity of the plate (u) can be used to control the amount of drag force exerted on it, which, in conjunction with the load limits determined by the mechanics of the curved buckling beam, determines whether and under what conditions buckling occurs.

The flat plate model describes the fluid dynamics of a system when the Reynolds number is low and the system is in the laminar regime. The Reynolds number of a flapping wing in fluid is formulated as follows $$Re = \frac{\bar{u}\bar{c}}{\nu} \qquad (13)$$

where $\bar{u}$, $\bar{c}$ and v are the mean translational velocity of the wing tip, the wing mean chord, and the kinematic viscosity of the fluid, respectively. For the given flapping system, $\bar{u}$=2ΦfR, where Φ and f are flapping peak-to-peak angular amplitude and frequency and R is moment arm to the center of pressure of the wing. For this wing flapping in water, the Reynolds number varies from 1800 to 7200 when the flapping frequencies varies from 0.1 to 0.4 Hz, indicating that the flow regime changes from laminar to turbulent at higher flapping frequencies.

The flat plate model was analyzed using a computational fluid dynamic (CFD) analysis on the system wing. In this analysis, measurements were made of the average lift and drag exerted on the wing by uniform water flow with different flowrates as the angle-of-attack varies from 0 to 180°. The results for the flow of 0.1 m/s versus the flat plate model estimation indicate a high correlation between the flat plate model and CFD results for the latter speed for which the system is in laminar regime. At the maximum studied flapping frequency, the mean translational velocity of the wing reaches 0.41 m/s for which, in the worst case, the maximum error between flat plate model and CFD results is less than 15%.

When a sinusoidal torque input is applied to the base joint, the dynamic model demonstrates that the wing system transitions between a nonbuckling flapping regime to a one-sided buckling regime, as shown in FIG. 3A, when the flapping frequency is increased. The wing system transitions from the nonbuckling regime to one-sided buckling at around 0.3 Hz. While the maximum positive torque increases with frequency in the power stroke, the torque in the recovery section remains low. The amount of work performed on the environment also grows with the emergence of buckling. The motion of the modeled wing through a full flapping cycle at 0.4 Hz is similar to the in-water flapping behavior.

Experimental Validation. The following results verify the effect of curvature on buckling force for a curved beam, as well as to demonstrate its potential for creating thrust and motion. Two case studies are considered (air and water) to validate the proposed methodology in order to underscore the generality of this concept, using the design principles from the previous section as a design guide.

Example 1

Figure 10B:
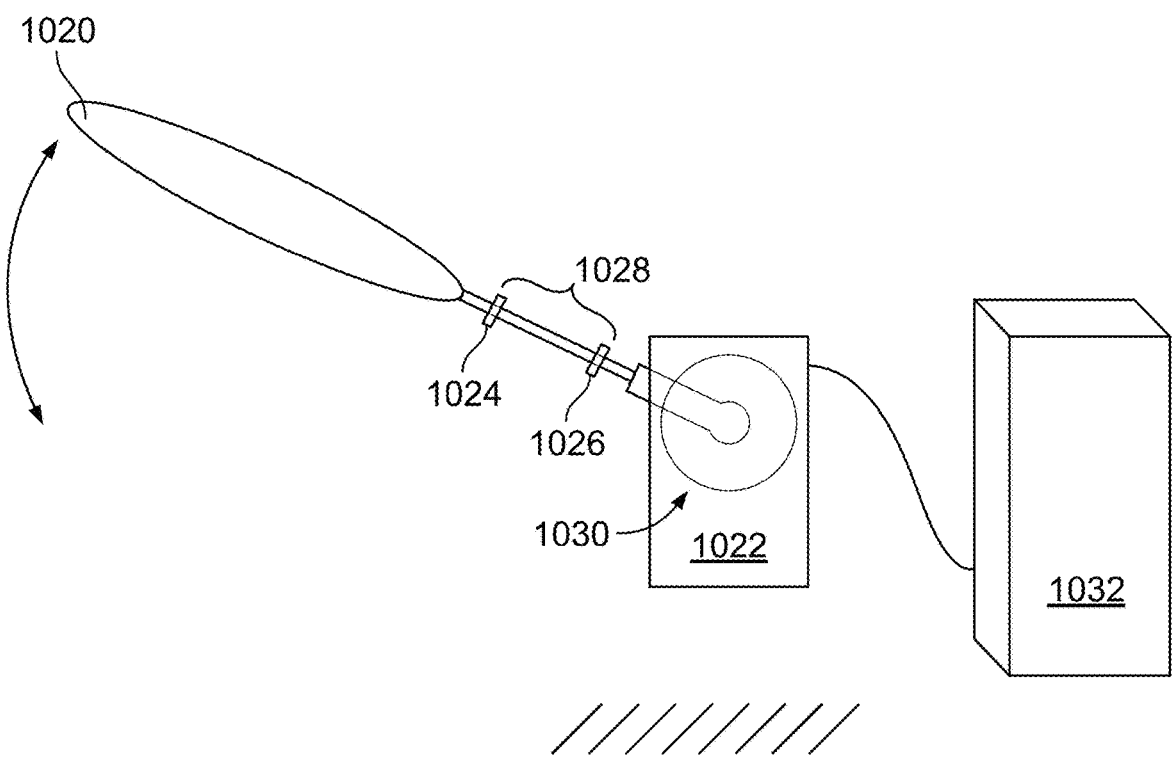
FIG. 10B depicts the test apparatus used for measuring air drag applied to a wing.

Wing Flapping in Air. In this example, the air drag exerted on a wing utilizing curved beam buckling is experimentally measured. The test apparatus is shown in FIG. 10B. The flapping wing 1020 is coupled to a dc servo motor 1022 by a 3D printed mount, permitting rapid swapping of different wing designs. Control sliders 1024 and 1026 are configured adjacent to the curved beam buckling region 1028. Forces and torques generated by flapping are measured with a six-axis ATI Mini-40 force/torque sensor 1030 mounted to the motor 1022 and ground and interfaced to a processor 1032 configured for data collection and motor control. The servo's position input signal is a triangular wave with a fixed amplitude of 66°; the frequency is varied in order to change the aerodynamic interactions experienced by the wing.

Variable Length (One Beam). Two different cases of symmetric flapping are used to demonstrate the effect of anisotropic buckling. In the first case, the sliders 1024 and 1026 are brought closer together; this shortens the exposed beam length (l) and prevents buckling in both directions of flapping and results in similar angle of attack and drag in both recovery phase upstroke and power phase downstroke. In the second case, the sliders 1024 and 1026 are arranged so that the gap between them is large enough to permit buckling in the equal-sense direction to occur during sinusoidal flapping. This longer buckling region allows the curved beam to buckle under drag forces in equal-sense bending, but is not sufficient to induce buckling in the opposite sense.

Plots of the moment generated by the wing during symmetric flapping as a function of the wing's angle and speed show that the shape of the nonbuckling curved beam's work loop is qualitatively symmetric (about torque $\tau=0$). This indicates that the average work—the area of the work loop in the positive $\tau$ domain minus the area of the work loop in the negative $\tau$ domain—over several flapping cycles provided by a nonbuckling beam is near zero. In contrast, the buckling beam shows an asymmetric path (about torque $\tau=0$), capable of producing nonzero work in the forward direction. The changes in power and work plots indicate the effectiveness of anisotropic buckling during symmetric flapping in generating nonzero thrust, power, and work.

The results demonstrate that the curved beam produces work in symmetric flapping when it is permitted to buckle. The average torque generated over one flapping cycle increases from 0.009 to 0.165 Nm in the presence of unidirectional buckling, as provided in Table 3. Though the wing-beam system is not optimized for energy efficiency, the mechanical energy efficiency increases from 1.86% to 29.5%. This is calculated by evaluating the ratio of useful work done over the total work done across a full flapping cycle.

TABLE 3

Torque and Work Generated During Flapping in Air

| Experiment | Frequency (Hz) | Average Torque (Nm) | Work (J) | Mechanical Efficiency | Buckling |
|---|---|---|---|---|---|
| Variable Length 1 Beam | 2.28 | −0.012 | −0.009 | 1.86% | No |
| | 2.28 | 0.131 | 0.165 | 29.50% | One side |
| | 1.38 | −0.005 | −0.005 | 2.98% | No |
| | 2.06 | 0.149 | 0.154 | 26.73% | One side |
| | 2.28 | 0.131 | 0.165 | 29.50% | One side |
| 2 Beams | 2.06 | 0.004 | 0.013 | 2.29% | No |
| | 2.28 | 0.031 | 0.019 | 2.56% | One side |
| | 2.48 | 0.077 | 0.095 | 10.30% | One side |

Variable Frequency (One Beam). The effect of drag on buckling was tested by increasing the frequency of the triangular input signal for the same curved beam. The torque generated via a symmetric flapping gait with respect to time, servo angle, and angular velocity was measured for the three flapping rates of 1.38, 2.06, and 2.28 Hz. The torque generated by each successive increase in flapping speed increases the magnitude of torques experienced in the positive direction without similar magnitude increases in the negative direction. This results in work performed on the environment. At 1.38 Hz, the beam experiences no buckling; however, the faster two cases (2.06 and 2.28 Hz) result in one-sided buckling. The average torque, amount of work done on the environment, and mechanical efficiency are listed in Table 3. The data reveal that the buckling duration of a full flapping cycle increases from 25% to 42% in one-sided buckling cases between 2.06 and 2.28 Hz. Although the hysteretic gaits obtained here by anisotropic buckling during flapping resembles gaits generated by other techniques such as the split cycle method, the effect in this case is a result of designed system dynamics rather than asymmetric motor inputs.

Variable Frequency (Two Beams). To address the non-negligible torsional effects visible in the wing during flapping, the system was stiffened in torsion by coupling two beams—40 mm apart from each other, in parallel—to the wing, as depicted in FIG. 8C. This reduced the noticeable effects of torsion on long thin beams and produced slightly different torques throughout flapping cycles at different speeds. The tests were conducted at 2.06 Hz, 2.28 Hz and 2.48 Hz. The results, provided in Table 3, show similar trends and behavior with the previous one-beam case, but because the system is stiffer (due to two beams in parallel), it requires higher velocities (and higher drag) to initiate buckling. This can be seen in the of 2.06 Hz case, which experiences no buckling in contrast to the single-beam trial. The data sampled in the two-beam case are smoother, with less high-frequency noise; this can be attributed both to a reduction in torsional effects as well as the impact of the altered stiffness on the resonant frequencies of the system.

Example 2

Flapping in Water. Flapping was also demonstrated in water, using a remote control (RC) servo to produce symmetric flapping while measuring the torques produced by the fluidic interactions. Test were performed on a single flapping cycle of a wing with a precurved buckling beam. The recovery stroke and a power stroke of sinusoidal control signal was observed. Hysteresis was visible between these strokes, indicating that the dynamic interactions between inertia, drag, and buckling play a role in deforming the beam anisotropically.

A sinusoidal input signal with constant amplitude and variable frequency was used to analyze the impact of flapping speed on buckling and torque. The torque generated for 0.1, 0.2, 0.3, and 0.4 Hz frequencies over several cycles was measured. The results demonstrate the effect of anisotropic beam buckling. The maximum positive torque increased from 0.05 to 0.43 Nm between 0.1 and 0.4 Hz while the negative torque generated during a flapping cycle was limited across all experiments to no less than −0.12 Nm. Table 4 shows the comparison between the generated torques in this experiment and values estimated by the dynamic model. The results of the two-beam design shown in FIG. 8C show that increased mechanism stiffness increases the torque that can be supported by the beam in recovery, undesirable from the perspective of gait efficiency. This design can require optimization against other design parameters to simultaneously reduce the effect of torsion and increase efficiency.

TABLE 4

Generated Torques in Simulation and Experimental

| | Simulation | | Experiment | | |
|---|---|---|---|---|---|
| Frequency | $\tau_{min}$ (Nm) | $\tau_{max}$ (Nm) | $\tau_{min}$ (Nm) | $\tau_{max}$ (Nm) | Buckling |
| 0.1 | −0.04 | 0.04 | −0.04 | 0.04 | No |
| 0.2 | −0.14 | 0.14 | −0.14 | 0.15 | No |
| 0.3 | −0.23 | 0.3 | −0.13 | 0.32 | One side |
| 0.4 | −0.24 | 0.46 | −0.12 | 0.44 | One side |

Using these results, a water-based robotic platform has been developed that leverages buckling during flapping. The robot uses curved beams coupled to two rigid fins made from 0.76 mm fiberglass sheet. The buckling portions of the links are made from a laminated composite of fabric, adhesive and 0.18 mm-thick polyester, which is used to reinforce the material during buckling.

Based on the properties of the curved beam, if the combination of force and moment experienced at the fin is between the equal and opposite-sense buckling values discussed earlier, the curved beam will buckle unidirectionally, resulting in a different angle of attack, which impacts the lift and drag forces acting on the fin by the fluid. As a result, drag on the robot will be different in power stroke and recovery stroke, creating a thrust differential over a gait cycle, which makes the robot swim forward. The magnitude of forces and moments caused by fin propulsion can be adjusted by controlling the amplitude and speed of the servo movements, size of the fin, length of the beam (l), and radius of curvature (r). The left and right fin servos follow a sinusoidal control signal of the form $$y_1 = A_i \sin(2\pi f_i t + a_i) + b_i \tag{14}$$

where $A_i$ represents an adjustable amplitude, $f_i$ represents the frequency, $a_i$ represents a phase offset, and $b_i$ represents an amplitude offset from the neutral point, which is nominally set to $b_i=0$ throughout these trials. This symmetric motion about the transverse and bilaterally symmetric robot guarantees that any forward locomotion can be attributed to the changes in drag caused by the buckling curved beam coupled to the fin. The forward thrust generated by symmetrical flapping of the two wings was measured for 0.1, 0.2, 0.3, and 0.4 Hz frequencies.

In water trials, the swimming robot was able to swim with an average speed of 0.1 m/s when $y_0=y_1$. The robot was able to rotate by using only one limb at a time. A nonbuckling fin acts more like a fish caudal fin and causes the robot to move laterally; because of buckling, the fin produces nonzero average torque, resulting in the robot turning.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A mechanical system comprising:
a curved beam;
a slider coupled to the curved beam and configured to alter an effective length of the curved beam; and
a motor coupled to the curved beam, wherein the motor is configured to impart a flapping motion to the curved beam.

2. The system of claim 1, wherein the curved beam is bistable.

3. The system of claim 1, further comprising a servomechanism coupled the curved beam and the motor.

4. The system of claim 3, wherein the motor is configured to activate the servomechanism, and the servomechanism is configured to impart the flapping motion to the curved beam.

5. The system of claim 3, wherein the servomechanism is configured to impart the flapping motion by controlling an amount of force exerted on an end of the curved beam.

6. The system of claim 1, wherein the flapping motion comprises buckling the curved beam only in the equal sense bending direction.

7. The system of claim 6, wherein a larger surface of the curved beam is configured to travel substantially parallel with a direction of motion of the mechanical system.

8. The system of claim 7, wherein a motion of the curved beam comprises a power phase and a recovery phase.

9. The system of claim 8, wherein drag forces on the curved beam in the power phase exceed drag forces on the curved beam during the recovery phase.

10. The system of claim 9, wherein the difference in drag forces generates nonzero average work over a flapping cycle.

11. The system of claim 10, wherein an input from the motor is symmetric.

12. The system of claim 1, wherein the curved beam is coupled to a wing.

13. The system of claim 1, wherein the curved beam is coupled to a fin.

14. The system of claim 1, wherein the mechanical system is a robot.

15. A robot comprising the mechanical system of claim 1.

16. The robot of claim 15, wherein the curved beam, is coupled to a wing or a fin.

17. A method of inducing locomotion comprising activating the mechanical system of claim 1.

18. The method of claim 17, wherein mechanical system is a robot.

19. The method of claim 18, wherein inducing the locomotion occurs in a fluid.

20. The method of claim 19, wherein the fluid comprises a gas or a liquid.

21. The method of claim 20, wherein the fluid comprises air.

22. The method of claim 20, wherein the fluid comprises water.

\* \* \* \* \*